(12) United States Patent
Goldenstein et al.

(10) Patent No.: US 10,223,465 B2
(45) Date of Patent: *Mar. 5, 2019

(54) CUSTOMIZABLE, REAL TIME INTELLIGENCE CHANNEL

(71) Applicant: CREOpoint, Inc., Cliffside Park, NJ (US)

(72) Inventors: Jean-Claude Goldenstein, San Francisco, CA (US); Kaimar Koemets, Tartu (EE); Ted Fine, New York, NY (US); Janno Järv, Tartu (EE); Edward J. Finn, Cliffside Park, NJ (US)

(73) Assignee: CREOpoint, Inc., Cliffside Park, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/642,890

(22) Filed: Jul. 6, 2017

(65) Prior Publication Data

US 2017/0308614 A1    Oct. 26, 2017

Related U.S. Application Data

(63) Continuation of application No. 14/772,598, filed as application No. PCT/US2014/023384 on Mar. 11, 2014.

(60) Provisional application No. 61/776,587, filed on Mar. 11, 2013.

(51) Int. Cl.
*G06F 17/30* (2006.01)

(52) U.S. Cl.
CPC .. *G06F 17/30867* (2013.01); *G06F 17/30528* (2013.01); *G06F 17/30554* (2013.01)

(58) Field of Classification Search
USPC .......................................................... 707/722
See application file for complete search history.

(56) References Cited

U.S. PATENT DOCUMENTS

| 7,162,473 | B2 | 1/2007 | Dumais et al. |
| 7,856,445 | B2 | 12/2010 | Gross |
| 8,166,026 | B1 | 4/2012 | Sadler |
| 9,672,555 | B1 * | 6/2017 | Dillard ............... G06Q 30/0631 |
| 2002/0103789 | A1 * | 8/2002 | Turnbull ........... G06F 17/30867 |

(Continued)

FOREIGN PATENT DOCUMENTS

| EP | 2973066 A1 | 1/2016 |
| KR | 10201610416 A | 1/2016 |
| WO | WO-2014164746 A1 | 10/2014 |

OTHER PUBLICATIONS

U.S. Appl. No. 14/772,598, filed Sep. 3, 2015, Customizable, Real Time Intelligence Channel.

(Continued)

*Primary Examiner* — Shyue Jiunn Hwa
(74) *Attorney, Agent, or Firm* — Schwegman Lundberg & Woessner, P.A.

(57) ABSTRACT

A customizable intelligence channel may be uniquely designed and implemented to contain only that information deemed to be relevant and material to a specific topic. The topic-related information provided via the intelligence channel may contain no extraneous results, irrelevant, and/or redundant information. The intelligence channel may be dynamically updated in real time, based on user input and/or crowdsourced data, to provide topic-related information.

23 Claims, 14 Drawing Sheets

(56) References Cited

U.S. PATENT DOCUMENTS

| | | | |
|---|---|---|---|
| 2004/0267700 A1 | 12/2004 | Dumais et al. | |
| 2007/0192300 A1 | 8/2007 | Reuther et al. | |
| 2010/0100537 A1 | 4/2010 | Druzgalski et al. | |
| 2010/0205541 A1* | 8/2010 | Rapaport | G06Q 10/10 715/753 |
| 2010/0275128 A1* | 10/2010 | Ward | G06Q 10/06 715/744 |
| 2011/0173214 A1 | 7/2011 | Karim | |
| 2013/0218596 A1* | 8/2013 | Gome | G06Q 10/06 705/3 |
| 2016/0019301 A1 | 1/2016 | Goldenstein et al. | |

OTHER PUBLICATIONS

"U.S. Appl. No. 14/772,598, Examiner Interview Summary dated May 21, 2018", 3 pgs.
"U.S. Appl. No. 14/772,598, Final Office Action dated Feb. 28, 2015", 21 pgs.
"Korean Application Serial No. 10-2015-7028749, Response filed Dec. 21, 2015 to Office Action dated Oct. 20, 2015", with English translation of claims.
"U.S. Appl. No. 14/772,598, Non Final Office Action dated Aug. 10, 2017", 21 pgs.
"U.S. Appl. No. 14/772,598, Preliminary Amendment filed Sep. 3, 2015", 3 pgs.
"U.S. Appl. No. 14/772,598, Response filed Jan. 10, 2018 to Non Final Office Action dated Aug. 1, 2017", 18 pgs.
"European Application Serial No. 14779027.3, Communication pursuant to Article 94(3) EPC dated Jan. 5, 2018", 8 pgs.
"European Application Serial No. 14779027.3, Extended European Search Report dated Oct. 20, 2016", 8 pgs.
"European Application Serial No. 14779027.3, Response filed May 5, 2016 to Communication Pursuant to Rules 161(2) and 162 EPC dated Nov. 6, 2015", 9 pgs.
"European Application Serial No. 14779027.3, Response filed May 12, 2017 to Extended European Search Report dated Oct. 20, 2016", 15 pgs.
"International Application Serial No. PCT/US2014/023384, International Preliminary Report on Patentability dated Sep. 24, 2015", 9 pgs.
"International Application Serial No. PCT/US2014/023384, International Search Report dated Jul. 1, 2014", 2 pgs.
"International Application Serial No. PCT/US2014/023384, Written Opinion dated Jul. 1, 2014", 7 pgs.
"Korean Application Serial No. 10-2015-7028749, Office Action dated Oct. 20, 2015", with English translation, 2 pgs.

* cited by examiner

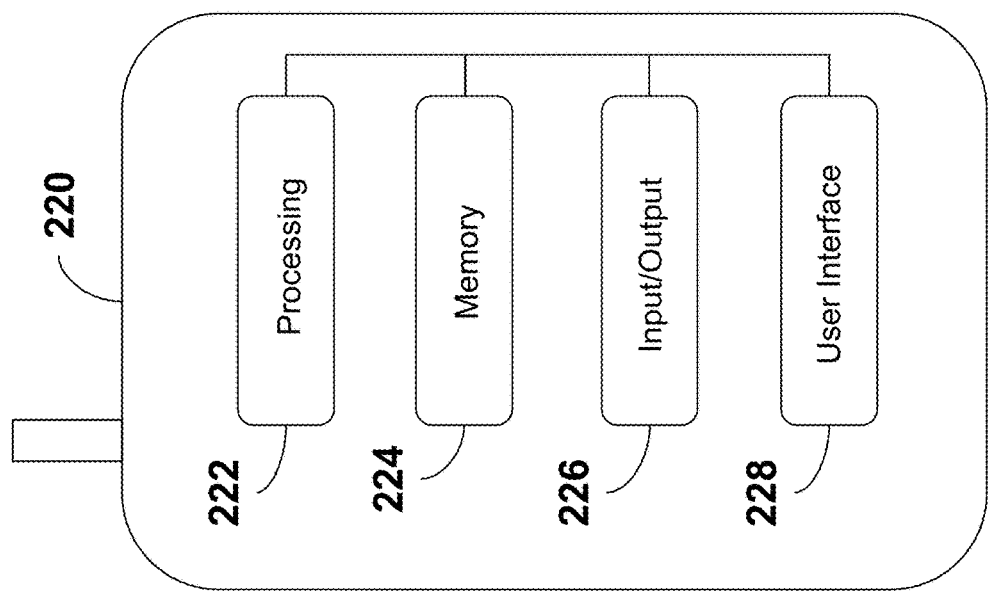

CUSTOMIZABLE, REAL TIME INTELLIGENCE CHANNEL

CROSS-REFERENCE TO RELATED APPLICATIONS

This application is a continuation application of U.S. patent application Ser. No. 14/772,598 filed Sep. 3, 2015, which is the National Stage of International Application No. PCT/US2014/023384 filed Mar. 11, 2014, which claims the benefit of and priority to U.S. Provisional Application No. 61/776,587 filed Mar. 11, 2013, the entireties of which applications are incorporated herein by reference for any and all purposes.

COPYRIGHT NOTICE AND PERMISSION

A portion of the disclosure of this document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The technical field generally relates to searching for and providing information, and more specifically relates to customizable provision of information.

BACKGROUND

It is not uncommon, when researching an item of interest, to receive unwanted, irrelevant, and/or redundant information, and/or to not receive desired information. Conducting research via traditional mechanisms may yield false positive results and/or results that are irrelevant to the research topic. Further, critical information may be missed. For example, attempts to research a firm such as Cushman & Wakefield using the initials C&W may yield information directed to Cable & Wireless. Traditional searches for industry topics and companies may fail due to ambiguity and/or due to unrelated activities of such industries/companies. For example, attempts to conduct research using the initials FDR may yield results regarding; Fonciere des Regions and information regarding Franklin Roosevelt, such as things named in his honor, including a memorial in Washington, D.C. and a highway in New York City. As another example, attempts to conduct research using the name Donald Trump may yield results regarding commercial real estate, politics, entertainment, and hairstyle articles.

SUMMARY

Customizable, real time information may be provided via intelligence channels. To generate a channel, a topic may be determined. The topic may be researched. A topic may comprise any appropriate topic. Keywords and/or parameters may be determined based on the research. Sources associated with the topic may be determined based at least in part on the parameters. Queries may be conducted on each source utilizing respective parameters. Results of the queries may be aggregated and/or filtered to remove, for example, irrelevant information, duplicative information, information lacking substantive content, profanity, or the like, or any appropriate combination thereof. Filtered results may be assembled for delivery via a channel. A channel may comprise a hub-like interface. The interface may comprise a user-friendly interactive display. A subscription management process may be implemented to track user interests, to refine a user's intelligence channel, to recommend additional intelligence channels based on user and/or usage characteristics, or the like, or any appropriate combination thereof.

BRIEF DESCRIPTION OF THE DRAWINGS

Aspects of a customizable, real time, intelligence channel are described more fully herein with reference to the accompanying drawings, in which example embodiments are shown. In the following description, for purposes of explanation, numerous specific details are set forth in order to provide an understanding of the various embodiments. However, the instant disclosure may be embodied in many different forms and should not be construed as limited to the example embodiments set forth herein. Like numbers refer to like elements throughout.

FIG. 14 is a block diagram of an example device that may be utilized to generate and/or implement an intelligence channel.

DETAILED DESCRIPTION OF ILLUSTRATIVE EMBODIMENTS

Figure 1:
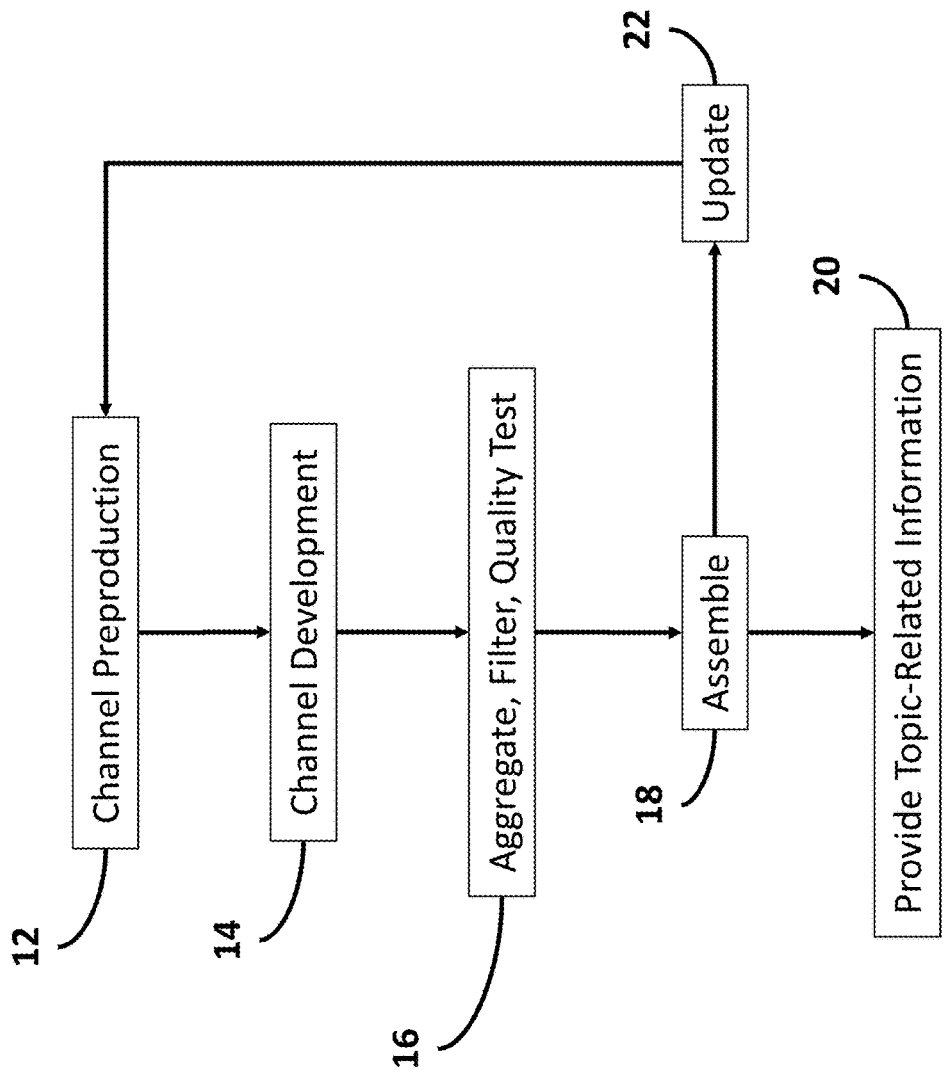
FIG. 1 is flow diagram of an example process for generating a customizable, real time, intelligence channel and providing information via the intelligence channel.

A customizable, real time intelligence channel as described herein may enable a user to keep apprised of, and/or deliver to others, selected topics by identifying and delivering relevant information culled from, for example, greater than hundreds of thousands of relevant sources while filtering out irrelevant and/or redundant information. In an example embodiment, an intelligence channel may provide the ability to identify, isolate, and access the most reliable, relevant sources for a topic, and deliver a stream of targeted, focused information pertaining to the topic. A topic may comprise any appropriate topic, and is not limited to any genre, category, or the like.

As described herein, an intelligence channel may be generated for a topic. The topic may be selected from predetermined topics, a topic may be selected from topic already available online, a topic may be provided by a user, a topic may be provided by a user and defined and developed through an iterative process that defines search terms, keywords, includes and excludes, language recognition capability and predefined filters, a topic may be a specific topic, a topic may be a specific topic for a specific user, or the like, or any appropriate combination thereof. Topics may be determined in any appropriate manner. For example, predictive data mining based on a user's email address, social graph, prior history of search or use of an intelligence channel, or the like, may be utilized to identify likely appropriate areas of interest and channels for the user.

In an example embodiment, predictive data mining may be utilized by identifying a user's home location, and accessing publicly available information to determine, for example, the income and interests of persons located in that area to predict interests of the user and recommend an intelligence channel. Predictive data mining also may rely, in whole or part, on prior use characteristics of the user or others related to the user by location, social media, or otherwise, to predict interests of the user and recommend an intelligence channel. Predictive data mining may be facilitated by the structure of a database, and the use of open source tools for the database, such as, for example, an open source non-SQL document database for big data analysis.

Sources of topic-related information may be determined in any appropriate manner. For example, a source of topic-related information may comprise any appropriate source, such as, an online source accessible via a Uniform Resource Locator (URL), social media, TWITTER, YOUTUBE, GOOGLE, FACEBOOK, YAHOO, BING, WIKIPEDIA, LINKEDIN, FLICKR, INSTAGRAM, PINTEREST, a photograph, an image, a publication, a forum, a blog, a forum, a video, a periodical, a research facility, an academic site, an industry specific site, a web site, a university, a feed, an RSS feed, or the like, or any appropriate combination thereof. A source(s) may be reviewed and the respective intelligence channel accordingly may be updated, or curated, based on, for example, crowdsourcing data, research by the subject matter experts, input from the user, or the like, or any appropriate combination thereof. A source(s) may be reviewed periodically, aperiodically, responsive to a request, responsive to an occurrence of an event, continuously, or the like, or any appropriate combination thereof.

Sources may be searched for topic-related information. Search results may be analyzed for redundant, irrelevant, immaterial, or the like, information. For example, search results may be analyzed for profanity, duplicate headlines, duplicate content, time wasters such as tweets dealing with social comments rather than topic-related items of interest, posts that are not in the user's language, posts that are not in a designated language or languages, dead hyperlinks to useless headlines, or the like, or any appropriate combination thereof. Analyzed search results may be filtered. Analyzed search results may be filtered to remove information from a source, remove a source, edit information from a source, or the like, or any appropriate combination thereof. In an example embodiment, sources and/or the level of filtering may be controlled by a user in real time, while topic-related information is being provided to the user. And filtered information may be refreshed and provided by the intelligence channel instantly, on demand. In an example embodiment, filtering may comprise a flexible noise-canceling algorithm(s) which may be updated to limit future sources of noise based on, for example, an analysis of usage and crowd sourced comments and input. Filtering also may be based on crowd-sourced determinations of authority and reliability of sources or items, based on user statistics and preferences.

FIG. 1 is flow diagram of an example process for generating a customizable, real time, intelligence channel and providing information via the intelligence channel. The example process depicted in FIG. 1, and as described in detail herein, may comprise any appropriate combination and/or sequence of channel preproduction (step 12), channel development (step 14), aggregating, filtering, and quality testing (step 16), assembling information for delivery (step 18), providing topic-related information (step 20), and updating contents of the intelligence channel (step 22).

Figure 2:
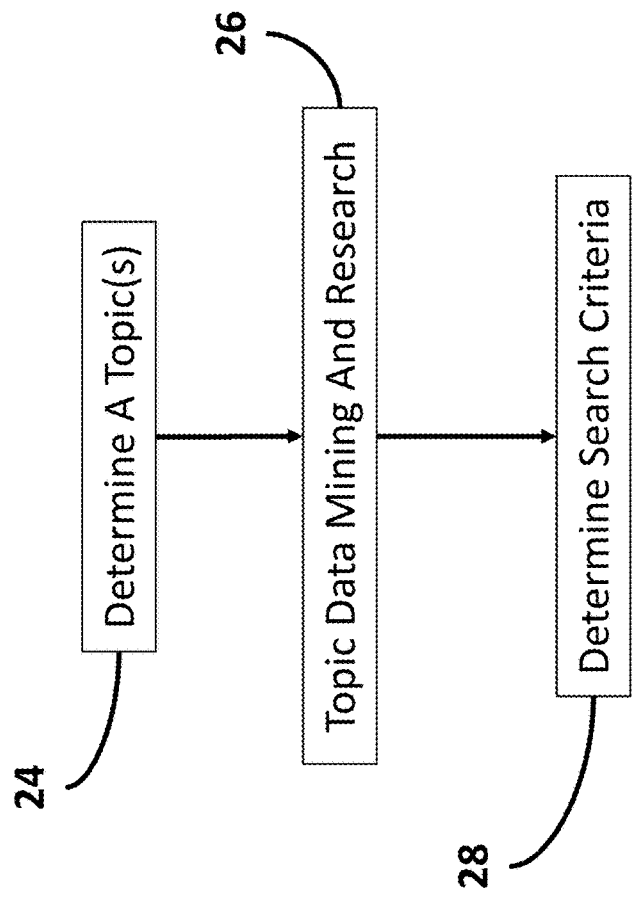
FIG. 2 is a flow diagram of an example process for intelligence channel preproduction.

FIG. 1 is described herein with reference to additional figures providing detail associated with each step depicted in FIG. 1. To that goal, as described above with reference to FIG. 1, channel preproduction may be performed at step 12. And FIG. 2 is a flow diagram of an example process for channel preproduction comprising any appropriate combination and sequence of determining a topic at step 24, topic data mining and research at step 26, and determining search criteria at step 28. A topic, or topics, may be determined at step 24. A topic may be selected from predetermined topics, a topic may be determined by a user, a topic may be a specific topic, a topic may be a specific topic for a specific user, or the like, or any appropriate combination thereof. Topics may be determined in any appropriate manner. A topic may comprise, for example, a company, an industry, a person, a group of persons, an asset, real property, intellectual property, a stock, a subject, a political entity, a city, a state, a country, a fashion trend, an activity, an event, an idea, an invention, a work, or the like, or any appropriate combination thereof. It is to be understood that there is no limitation on the type of a topic. In an example embodiment, a topic may use Boolean search expressions combining multiple topics; including some aspect(s) of a topic while excluding others. A Boolean topic search logic may link of ten or more Boolean terms, despite limitations on the number of search terms imposed by some search engines. It is to be understood however, that there is no limit on the number of terms included in a topic search.

Topic data mining and research may be performed at step 26. Any appropriate information may be analyzed to determine and/or suggest a topic to the user. For example, a user's assets, email, social media accounts, search engines, GOOGLE, BING, LINKEDIN, WIKIPEDIA, user profile information, a web site, a company web site, a government web site, an employer's web site, or the like, or any appropriate combination thereof, may be utilized to determine a topic. Predictive data mining may be utilized to identify likely appropriate areas of interest and channels for the user. In an example embodiment, predictive data mining based on a user's email address may be utilized to identify likely appropriate areas of interest and channels for the user. An email domain may be analyzed to identify an association, from which interest(s) may be determined. For example, it may be determined and/or inferred that a user with an @aol.com extension has had the email account for a long time, but has not kept up with the times. As another example, it may be determined and/or inferred that a name like johndoe@gmail.com indicates an early adopter, or person@bakerlaw.com would likely have an interest in legal-related information, or one with an @woodcock.com extension would have a particular interest in IP law. It may be determined and/or inferred that a user with an xxx.fr email address may prefer information in the French language.

Search criteria may be generated, at step 28, to facilitate a determination of potential topic-related sources. Search criteria may be inclusive or exclusive. Inclusive search criteria may be utilized to search for information containing the inclusive search criteria. Exclusive search criteria may be utilized to exclude information containing the exclusive search criteria. Search criteria may comprise, for example, inclusive keywords, exclusive keywords, inclusive search terms, exclusive search terms, inclusive search phrases, exclusive search phrases, inclusive queries, exclusive queries, information indicative of a false positive search result, redundant information, or the like, or any appropriate combination thereof. Search criteria may be combined using Boolean operators to query many sources with differing application programming interfaces (API's) and semantic requirements. The API's, versions, and semantic structure requirements associated with any source may be determined for each source from, for example, a database library.

Figure 3:
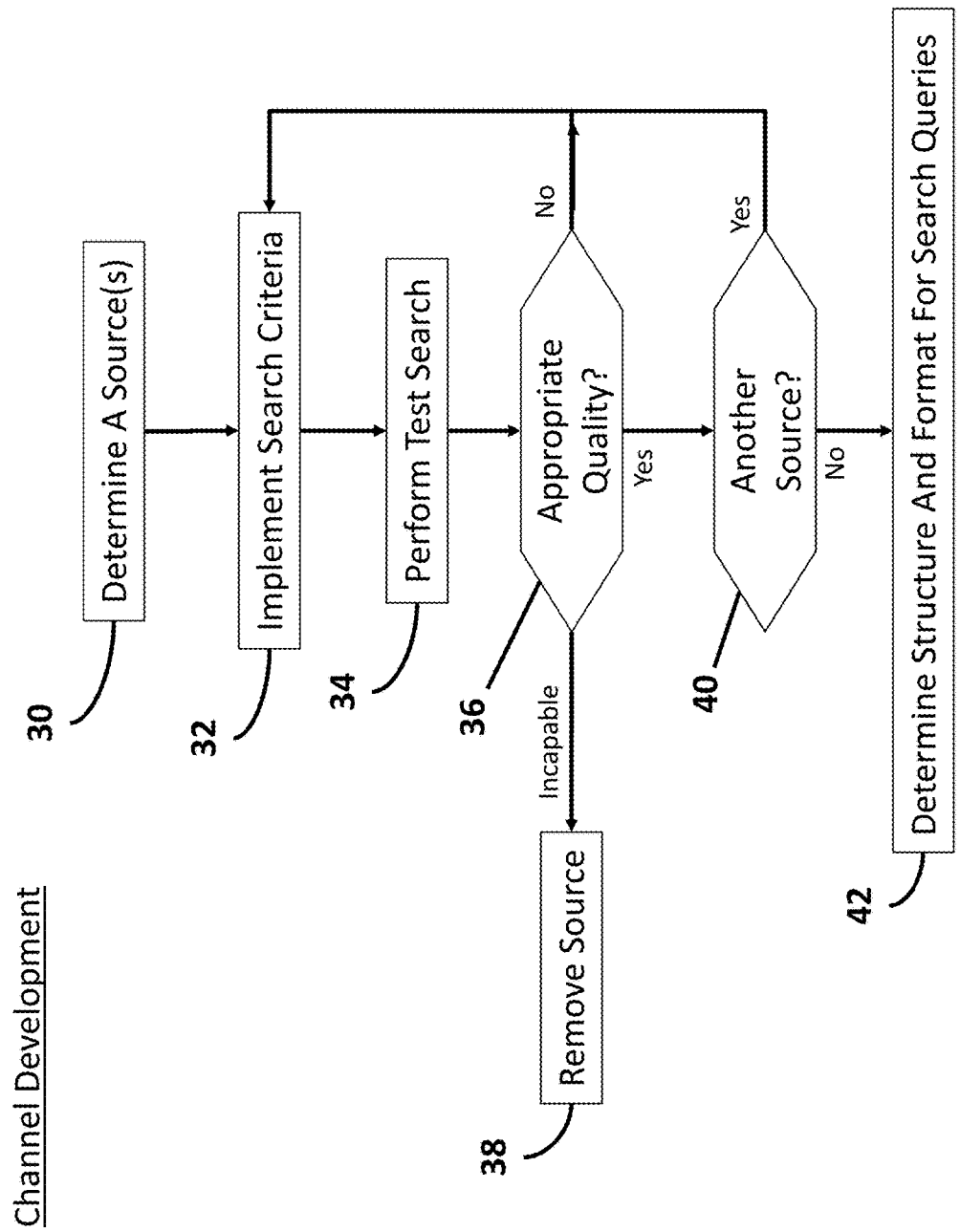
FIG. 3 is a flow diagram of an example process for intelligence channel development.

As described above, with reference to FIG. 1, channel development may be performed at step 14. And FIG. 3 is a flow diagram of an example process for channel development comprising any appropriate combination and sequence of determining a source, or sources at step 30, implementing search criteria at step 32, performing a test search or searches at step 34, determining a quality of results at step 36, removing a source from potential sources at step 38, determining if other sources exist at step 40, and determining a structure and format for search queries at step 42.

A source, or sources, of topic-related information may be determined at step 30. A source of topic-related information may comprise any appropriate source, such as, for example, social media, TWITTER, YOUTUBE, GOOGLE, FACEBOOK, YAHOO, BING, WIKIPEDIA, LINKEDIN, FLICKER, INSTAGRAM, PINTEREST, a photograph, an image, a publication, a forum, a blog, a forum, a video, a periodical, a research facility, an academic site, an industry specific site, a web site, a university, a library, audio, radio, television, a feed, and RSS feed, or the like, or any appropriate combination thereof. A source may include any data accessible in digital form through a URL, and may include non-textual data such as that developed by sensors in buildings, homes, vehicles, appliances, and other monitoring devices and available digitally through a URL. Topic-related information may be selected and curated from all available sources. A source may be reviewed and, as described in more detail herein, the respective intelligence channel may be updated based on, for example, crowdsourcing data, research by the subject matter experts, input from a user, or the like, or any appropriate combination thereof.

In an example embodiment, an API for each source is determined. An API for a source may be unique for a respective source. That is, a source may have associated therewith a unique API, or any appropriate version thereof. A description of each API for each source may be stored, for example, in a database. A description of each API for each source may be stored, for example, in a database. Source may include individual websites, and accordingly, a database may be established to store API variations, even when websites may appear to use a common API.

Search criteria may be implemented, at step 32, to facilitate determination of a source, or sources, of topic-related information from potential sources. In an example embodiment, search criteria determined at step 28 may be implemented at step 32. Search criteria may be implemented on each prospective source. Search criteria may be implemented utilizing an appropriate semantic protocol, which may include appropriate Boolean terms and operators, required by a respective source. In an example embodiment, search criteria may be implemented utilizing an appropriate semantic structure and the digital format required by a respective source.

A test search, or searches, to assess the quality of information from a prospective source may be performed at step 34. Search results may be used in an iterative process in which search criteria that control the search may be altered until the prospective source produces the appropriate quality results. If a prospective source does not produce appropriate quality results, the prospective source may not be selected as a source of topic-related information for the intelligence channel. It may be determined, at step 36, if the quality of information from a prospective source is appropriate. If it is determined, at step 36, that the quality of the information from a prospective source is not appropriate, the process may proceed to step 32 to refine search criteria, and to implement refined search criteria, and proceed therefrom as described herein. If, after an appropriate attempt to refine search criteria and to adjust the quality of the information from a prospective source, it is not possible to improve the quality to an acceptable level, the prospective source may be remove from a list of prospective sources (e.g., no longer considered).

Quality initially may be determined during the channel development process to relate to the relevance of the returned items from a source to the topic. Keywords, include and exclude criteria as well as sources included or excluded may be adjusted to improve quality of an intelligence channel. Intelligence channel quality may be determined by crowdsourced information developed through the actions of intelligence channel users in visiting, deleting, or curating the source from the intelligence channel. As each user may rate an item, or delete an item from the user's intelligence channel, aggregate actions by users may be used to determine the quality of a source or particular item to the intelligence channel, as a source frequently visited may be deemed to be of high quality and one frequently curated out of the intelligence channel by users may be deemed to be of low quality. The quality determination within an intelligence channel may be applied in other intelligence channels, or not, as appropriate.

If it is determined, at step 36, that the quality of information from a prospective source is appropriate, it may be determined, at step 40, if another prospective source is to be tested. If it is determined, at step 38, that another prospective source is to be tested, the process may proceed to step 32 and proceed therefrom as described herein. If it is determined, at step 40, that there is not another source to be tested, a series of semantic protocol/digital format combinations for search queries for each source (selected from prospective sources) for a given channel topic may be determined at step 42. The semantic structure and digital format of each search query may be saved for future use. The final semantic structures and digital formats may be available for fusion with other intelligence channels in the development of new and/or additional intelligence channels.

Figure 4:
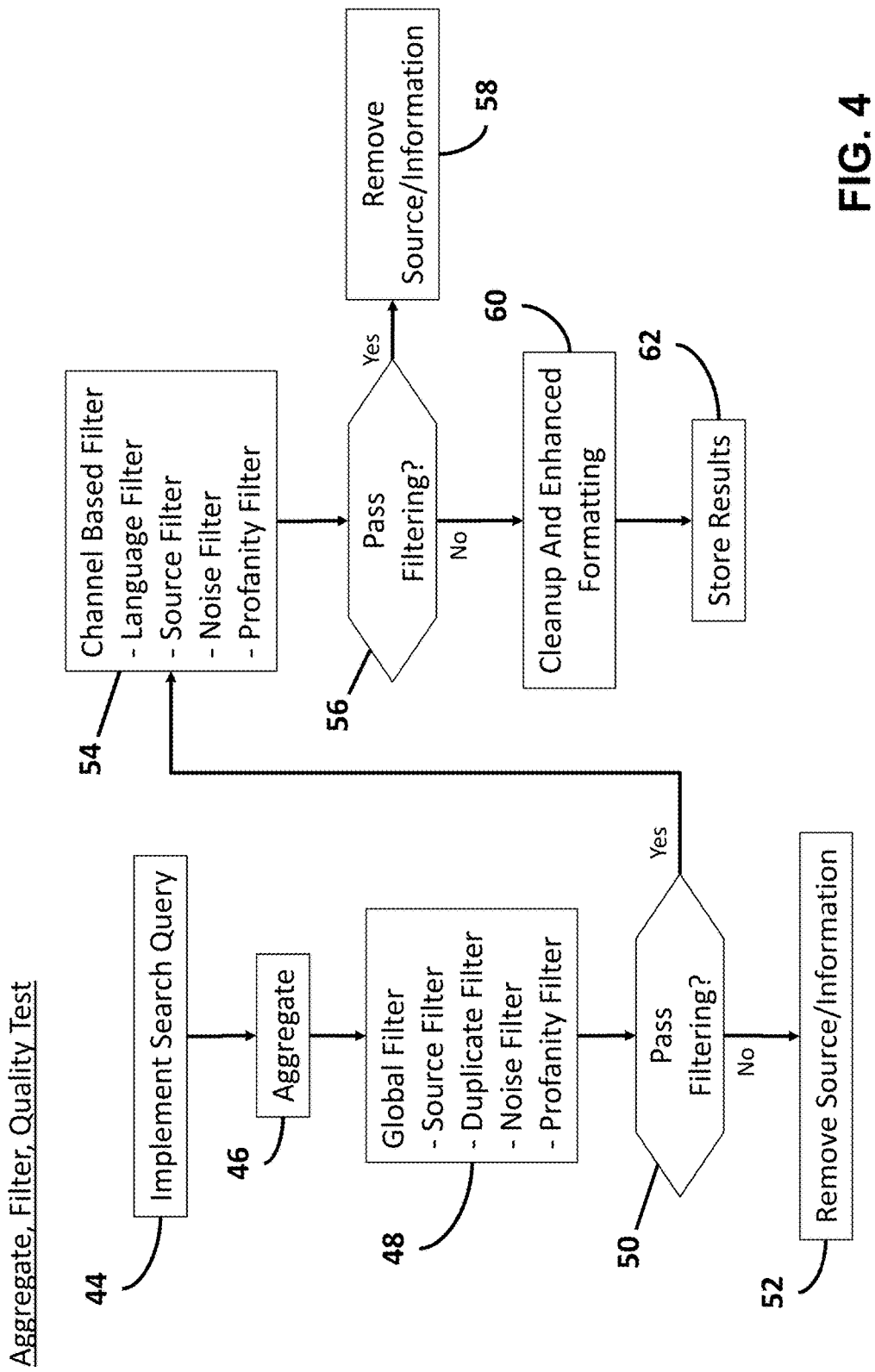
FIG. 4 is a flow diagram of an example process for aggregating, filtering, and quality testing.

As described above, with reference to FIG. 1, aggregating, filtering, and quality testing may be performed at step 16. And FIG. 4 is a flow diagram of an example process for aggregating, filtering, and quality testing comprising any appropriate combination and sequence of implementing a search query at step 44, aggregating information from sources at step 46, performing global filtering at step 48, determine information that has passed global filtering at step 50, removing a source and/or information that has not passed global filtering at step 52, performing channel based filtering at step 54, determine information that has passed channel based filtering at step 56, removing a source and/or information that has not passed channel based filtering at step 58, performing clean up and enhancing formatting at step 60, and storing results at step 62.

A search query may be implemented at step 44. The search query may be performed on each topic-related source of the intelligence channel. Each source may be queried with a search query comprising appropriate search parameters based on the user's selected topic. A search query may comprise search criteria as previously described. Each search query may be formatted to meet needs of a respective source. In an example embodiment, search queries comprising appropriate search parameters may be provided to each source in a format appropriate for each source. Accordingly, results (e.g., topic-related information) may be received from each source. For example, TWITTER allows a Boolean search structure which groups operations using parentheses to indicate orders of operations, so that APPLE AND (iPhone OR iPad or iPod). GOOGLE does not allow the use of parentheses in the semantic structure or to indicate an order of operations, so the same search must be structured as: "Apple iPhone", "Apple iPad", "Apple iPod".

Results may be aggregated at step 46. Aggregation may require data-normalization, as results may vary in their data structure. Sources may provide results in differing data structures or formats. Results may be mapped to a database based on the particular data structure employed by the source. Results may be aggregated using formatters which process incoming data using data mappings based on the source, and may be stored in a standard data structure. Results may be stored (e.g., in a database). As additional searches are conducted, results may be added to (inserted into) stored results. A unique index to an item URL field may be generated. During storage of results, if an item is determined to be in the URL field, the URL field may be skipped (result not added to, or inserted into, stored results). During storage of results, if an item is determined not to be in the URL field, the results are added to the stored results.

Filtering may be performed prior to storage of results. Filtering may affect storage of results and aggregation. For example, an influencer blacklist may be performed before the insertion process. For website resources, the influencer may be the website itself. For example, huffingtonpost.com, for social media sources, the influencer is the actual user. Entire websites may be banned on domain level or top level domain, e.g., .cn, .biz, .casino etc., social media user on user level. Thus, items resulting from these influencer filters may be skipped and not stored. In an example embodiment, the results from each source may be combined and incorporated into a data stream. The data stream may be filtered.

The data stream may be globally filtered at step 48. Global filtering may comprise any appropriate combination of source filtering, duplicate filtering, noise filtering, or profanity filtering. Source filtering may be performed at step 48. Source filtering may be utilized to remove irrelevant sources and/or spam. In an example embodiment, source filtering may compare a dictionary of continuously updated domain names and social media usernames with the article source URL. If there is a match, the item may be tagged and identified for further review. If information does not pass source filtering, as determined at step 50, the source and/or information may be removed from the data stream at step 52. If information does pass source filtering, as determined at step 50, upon completion of global filtering, the process may proceed to step 54.

Duplicate filtering may be performed at step 48. Duplicate filtering may compare individual article headlines and/or articles to identify and remove duplicate articles. In an example embodiment, article may be compared in chronological order to identify and remove duplicates articles and/or article that are somewhat close (comprise duplicative information). If duplicates are identified, they may be removed. If information does not pass duplicate filtering, as determined at step 50, the source and/or information may be removed from the data stream at step 52. If information does pass duplicate filtering, as determined at step 50, upon completion of global filtering, the process may proceed to step 54. For example, many news items may be repeated, and many press releases may be printed in multiple publications. To avoid wasting a user's time, these duplicate items may be filtered out by headline and/or by content.

Noise filtering may be performed at step 48. Noise filtering may remove items that do not add value, that are irrelevant to the topic, or the like, or any appropriate combination thereof. In an example embodiment, noise filtering may identify items of limited relevance and/or items that lack substantive content. Noise filtering may remove items of limited relevance and/or items that lack substantive content from the data stream. If information does not pass noise filtering, as determined at step 50, the source and/or information may be removed from the data stream at step 52. If information does pass noise filtering, as determined at step 50, upon completion of global filtering, the process may proceed to step 54.

Profanity filtering may be performed at step 48. Profanity filtering may compare keywords, phrases, images, video, etc. (e.g., a dictionary) with articles obtained from a respective source to identify profanity in the article. In an example embodiment, the profanity filter (e.g., the dictionary) may be tailored for a particular user. For example, a parent may tailor the profanity filter to remove any information that the parent may determine to be inappropriate for children. If information does not pass profanity filtering, as determined at step 50, the source and/or information may be removed from the data stream at step 52. If information does pass profanity filtering, as determined at step 50, upon completion of global filtering, the process may proceed to step 54.

Channel based filtering may be performed on the data stream at step 54. In an example embodiment, channel based filtering may comprise any appropriate combination of language filtering, source filtering, or noise filtering. As described herein, channel filtering operates strictly within a particular intelligence channel, while global filtering operates universally. For example, assume an intelligence channel in which the topic is high performance automobiles. The intelligence channel may include all manufacturers but an intelligence channel could be filtered for use by General Motors to remove all other manufacturers.

Language filtering may be performed at step 54. Intelligence channels may be filtered by specific language. In an example embodiment, if a language is, or one or more specific languages are, designated, all nondesignated languages, as determined at step 56, may be filtered out at step 58. That is, all articles in a language other than a designated language, or languages, may be removed from the data stream at step 58. And, upon completion of channel based filtering, the process may proceed to step 60. In an example embodiment, a nondesignated language may be translated to a designated language.

Source filtering may be performed at step 54. Source filtering may be utilized to remove irrelevant sources and/or spam. In an example embodiment, source filtering may compare a dictionary of continuously updated domain names and social media usernames with the article source URL. If there is a match, the item may be tagged and identified to be excluded or for further review. If information does not pass source filtering, as determined at step 56, the source and/or information may be removed from the data stream at step 58. If information does pass source filtering, as determined at step 56, upon completion of global filtering, the process may proceed to step 60.

Noise filtering may be performed at step 54. Noise filtering may remove items that do not add value, that are irrelevant to the topic, or the like, or any appropriate combination thereof. In an example embodiment, noise filtering may identify items of limited relevance and/or items that lack substantive content. Noise filtering may remove items of limited relevance and/or items that lack substantive content from the data stream. If information does not pass noise filtering, as determined at step 56, the source and/or information may be removed from the data stream at step 58. If information does pass noise filtering, as determined at step 56, upon completion of global filtering, the process may proceed to step 60.

Profanity filtering may be performed at step 54. Profanity filtering may compare keywords, phrases, images, video, etc. (e.g., a dictionary) with articles obtained from a respective source to identity profanity in the article. In an example embodiment, the profanity filter (e.g., the dictionary) may be tailored for a particular user. For example, a parent may tailor the profanity filter to remove any information that the parent may determine to be inappropriate for children. Any article determined to contain profanity, may be removed from the data stream. If information does not pass profanity filtering, as determined at step 56, the source and/or information may be removed from the data stream at step 58. If information does pass profanity filtering, as determined at step 56, upon completion of global filtering, the process may proceed to step 60.

Article cleanup and enhanced formatting may be performed at step 60. Advertisements may be removed from article content. Content may be formatted as needed in order to provide information via an intelligence channel. Semantic analysis of article content may be performed in order to select photographs, places, names, companies, addresses, and/or phone numbers in order to enhance channel definition, generate word clouds, and deliver enhanced content. Natural language processing may be employed to highlight elements of interest, such as names of persons or entities, monetary values, locations, or the like. Final results may be may be stored at step 62. In an example embodiment, stored results may be available for delivery to any user selecting that channel. Stored results may be available for combination with other channels. Stored results may be available for updating. In an example embodiment, if a result is combined and/or updated, a time associated with the combination and/or update may be stored. Users selecting the channel within a predetermined time interval may receive the stored information. A user inquiry received outside of the predetermined time interval may trigger a new inquiry in order to obtain fresh and timely results.

As described above, with reference to FIG. 1, assembly of information may be performed at step 18, topic-related information may be provided at step 20, and information may be updated at step 22. Assembled information may be provided via an intelligence channel via a customized interface. The interface may be in the form of a hub comprising a customized dashboard. Results received for each channel ordered by a user may be combined and delivered via the customized hub.

Figure 5:
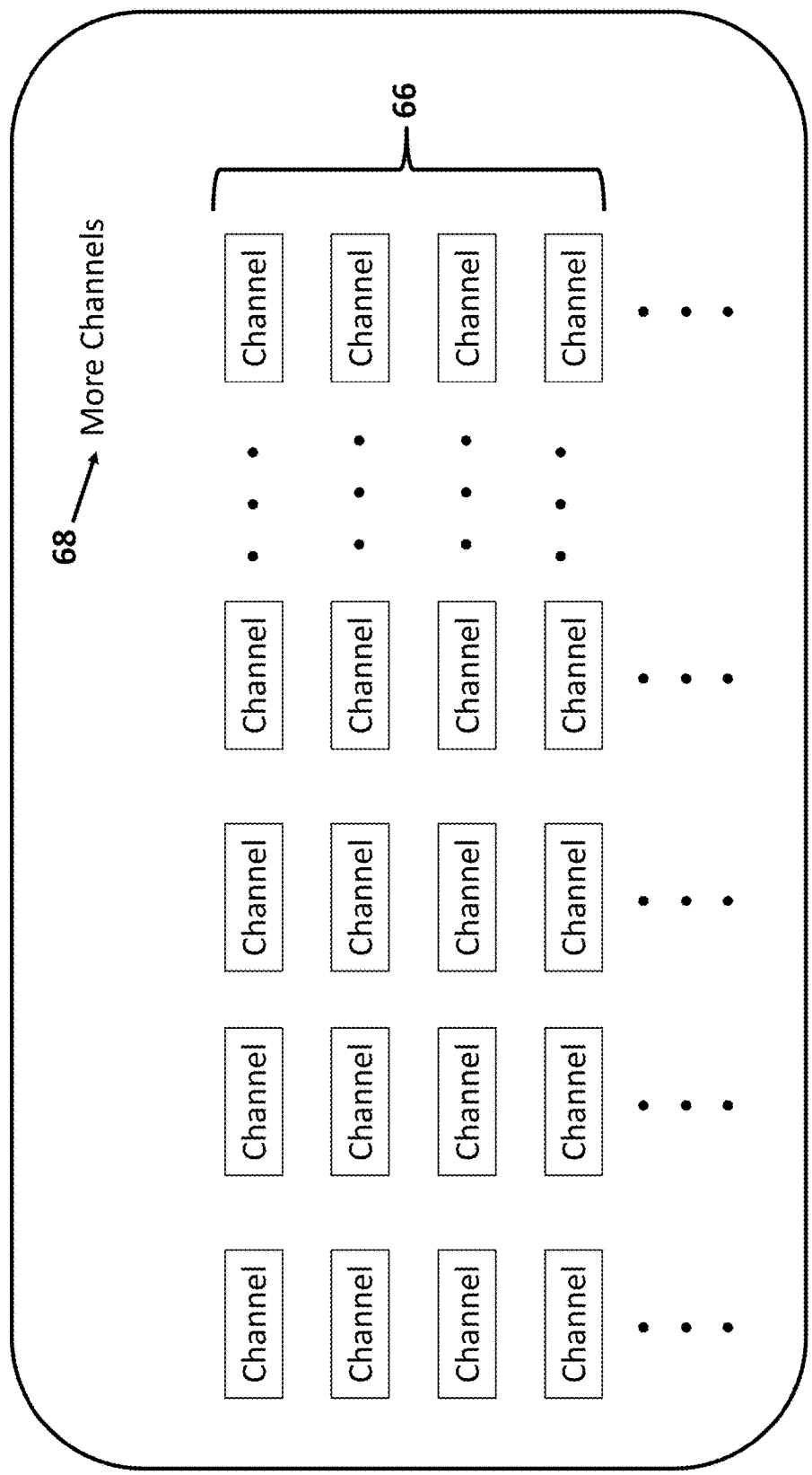
FIG. 5 depicts an example interface comprising a plurality of intelligence channels.

FIG. 5 depicts an example interface 64 comprising a plurality of intelligence channels 66. Each channel depicted in FIG. 5 represents a different intelligence channel. An intelligence channel may be a predetermined (predefined) channel provided by the system, an intelligence channel may be determined by a user, or any appropriate combination thereof. Thus, the plurality of intelligence channels 66 may represent a plurality of predetermined intelligence channels, a plurality of user-defined intelligence channels, a plurality of intelligence channels of a user's favorite list, or any appropriate combination thereof. As depicted in FIG. 5, more intelligence channels may be accessed by selecting item 68 labeled as "More Channels."

The interface 64 may be considered as a hub-like center, or e-store, via which a user may access intelligence channels. Channels and news may be delivered to the user through the hub like interface 64. The hub-like interface 64 may be presented in any appropriate manner and/or format. In an example embodiment, the hub-like interface 64 may be presented as "myChannels" page, or the like, which may be accessible by being displayed on all website pages. The hub-like center may be applied to channels already selected by a user or to additional channels which may be available.

An intelligence channel as rendered via the interface 64 may comprise any appropriate information that identifies the intelligence channel. For example, an intelligence channel may comprise an icon, text, video, sound, or any appropriate combination thereof that identifies the intelligence channel.

When an intelligence channel is selected, topic-related information may be provided via the intelligence channel. An intelligence channel may be selected in any appropriate manner. As described herein, selection of a rendering on an interface may be accomplished in any appropriate manner, such as, for example, clicking on a rendering, tapping a rendering, touching a rendering, making a gesture over a rendering, making a gesture proximate to a, providing an audio command, or the like, or any appropriate combination thereof. Accordingly, in an example embodiment, an intelligence channel may be selected via the interface 64 by clicking on the rendering of the intelligence channel, by tapping the rendering of the intelligence channel, by touching the rendering of the intelligence channel, by making a gesture over the rendering of the intelligence channel, by making a gesture proximate to the rendering of the intelligence channel, by providing an audio command, or the like, or any appropriate combination thereof.

Figure 6:
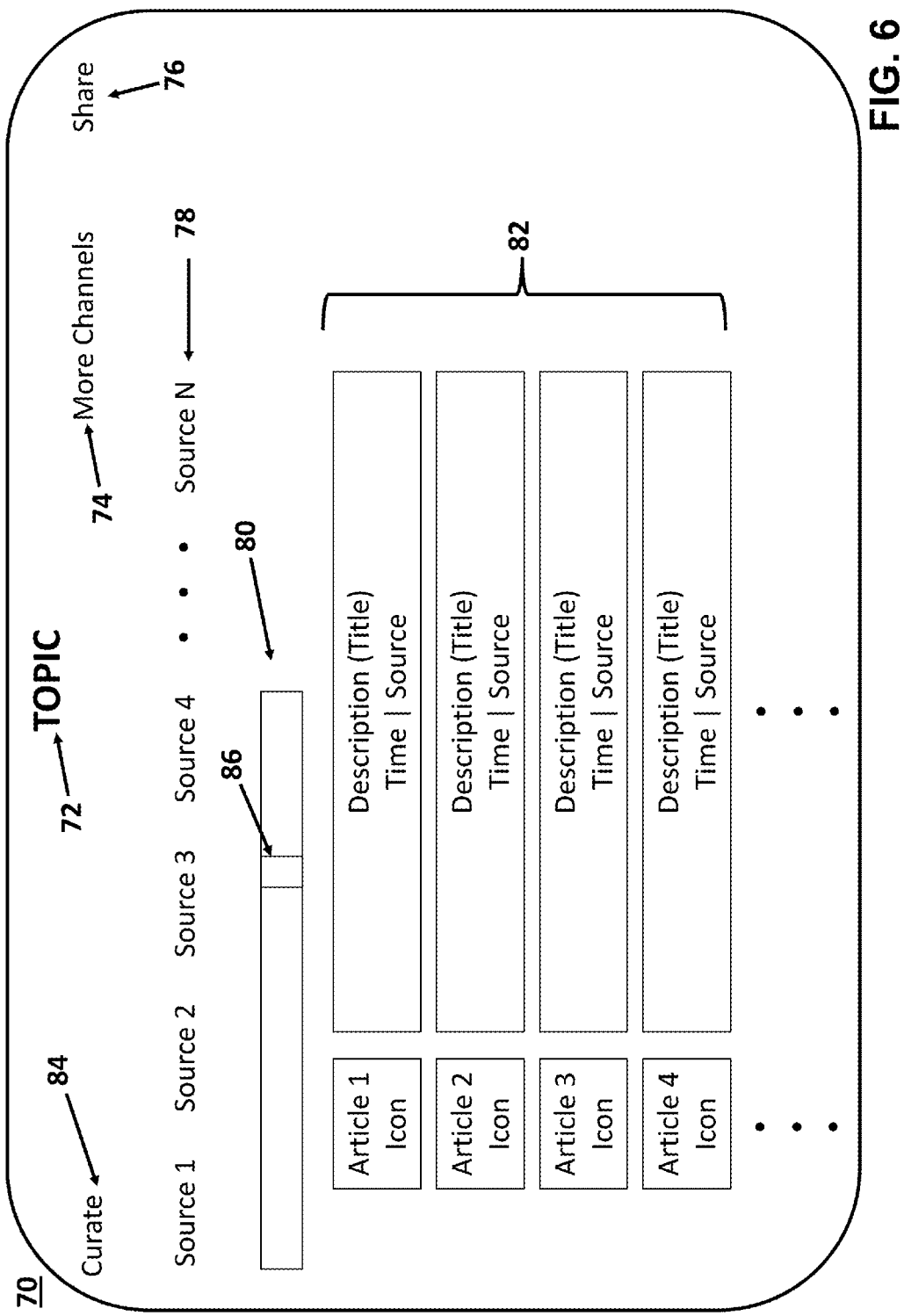
FIG. 6 depicts an example illustration of an intelligence channel interface.

When an intelligence channel is selected, topic-related information may be provided in real time. FIG. 6 depicts an example illustration of a user friendly, interactive, intelligence channel interface 70. In an example embodiment, interface 70 may comprise an interactive display of an apparatus, device, server, computer, or the like. In an example embodiment, interface 70 may comprise any appropriate combination of a selectable source portion or region 78, a portion or region allowing selection of more intelligence channels 74, a portion or region allowing sharing of the intelligence channel 76, an adjustable filter portion or region 80, and dynamically configurable content portion or region 82. In an example embodiment, the interface 70 may comprise a web page or the like. The topic may be rendered via the interface 70 as depicted by item 72. More channels may be accessed by selecting item 74.

The selectable source region 78 may provide individually selectable access to a plurality of sources of topic-related information (e.g., Source 1, Source 2, Source 3, Source 4, . . . Source N), wherein each source of the plurality of topic-related sources may comprise information related to a topic and may be individually selectable. The content region 82 may render topic-related information (e.g., Article 1, Article 2, Article 3, Article 4 . . . ) and provide access to a source of the rendered topic-related information. The adjustable filter region 80 may provide adjustable filtering of the dynamically configurable content region 82, wherein content of the content region 82 may be dynamically modified, in real time, based on the adjustable filtering of the filter render in filter region 80.

An intelligence channel may be shared by selecting item 76. An intelligence channel and/or information provided via an intelligence channel may be shared via, for example, email, social media, TWITTER, LINKEDIN, FACEBOOK, GOOGLE+, a social network, a news article, a test message, or the like, or any appropriate combination thereof.

Sources 78 of topic-related information may be rendered on the interface 70. Each rendering of a source may be selectable in a toggle-like fashion, wherein selection of a rendering of a source may allow information to be received from the source, and a subsequent selection of the source may prevent information from being received from the source. For example, Source 1 may represent TWITTER, Source 2 may represent GOOGLE, and Source 3 may represent a user-defined source. Selecting Source 1 may allow topic-related information from TWITTER to be received and rendered in the plurality of articles 82. A subsequent selection of Source 1 may prevent information from being received from TWITTER, and previously rendered articles from TWITTER would be removed from the plurality of articles 82. Similarly, selecting Source 2 may allow topic-related information from GOOGLE to be received and rendered in the plurality of articles 82. A subsequent selection of Source 1 may prevent information from being received from GOOGLE, and previously rendered articles from GOOGLE would be removed from the plurality of articles 82. And, selecting Source 3 may allow topic-related information from the user-defined source to be received and rendered in the plurality of articles 82. A subsequent selection of Source 3 may prevent information from being received from the user-defined source, and previously rendered articles from the user-defined source would be removed from the plurality of articles 82.

In an example embodiment, filter of topic-related information may be adjustable via the interface 70. For example, slider 80 may function as a filter. Selecting and moving control 86 to the left or to the right of slider 80 may more or less filter topic-related information based on influence of the source and/or relevance of the item. For example, selecting and moving the control 86 to the left end of slider 80 may allow less influential and/or less relevant topic-related information to be received. And selecting and moving the control 86 to the right end of slider 80 may allow only more influential and/or more relevant topic-related information to be received. Thus, in this example scenario, the left edge of slider 80 represents less restriction and the right edge of slider 80 represent more restriction. As slider 80 is adjusted via control 86, the information rendered in the plurality of articles 82 may accordingly be adjusted.

The functionality invoked via slider 80 may determine a combined ranking of each item by relevance and influence (referred to herein as myCREOrank). In an example embodiment, the slider 80 scale may allow positioning from left to right, from a position designated "All" which returns all items to the channel to the far right position which may be designated "myCREOpicks", and returns only the most relevant items from the most influential sources. Slide 80 may be positioned at intermediate points to allow more or less relevant items from more or less influential sources to be shown. The myCREOrank filtering by influence and relevance may be based on an algorithm which may be applied to all items in the database which have been initially selected for inclusion in the channel, based on the search for topic-related keywords.

The myCREOrank may be calculated based on influencer online presence metrics and/or channel context. For influencer online presence metrics (Influencer), metrics may be obtained from social networks and/or various third party services for each influencer, or the like. Influencer metrics may vary depending on Influencer type—a web site or a social network user. Example Influencer metrics may include TWITTER—number of posts user has made, number of followers, retweets etc., YOUTUBE—number of user videos, number of views each video has got, average number of views etc., Blog—number of posts, number of follower, number of reposts, links etc., Web page—Google Page rank, or the like, or any appropriate combination thereof.

To compare different Influencer metrics, Influencer metrics may be weighted based on various characteristics and returned as Score (0-100). The weighting methodology may be based on academic research, other publications, information available online, or the like, or any appropriate combination thereof. The weighting methodology may be subject to adjustment based on crowd-sourced information (i.e., the actions of users of the channel such as views and curation of items) and refinement. Thus, Score may represent online popularity.

Channel context (Relevance) may be indicative of highly ranked items related closely to the channel topic. A post by a highly ranked influencer may not be as relevant to a particular channel as a post from a generally less highly ranked influencer. Therefore, a relevance score may be determined by considering such items as the number of mentions of topic-related keywords in an item, a ratio of topic-related keywords to other words in the item, the number of mentions of topic-related keywords in the item headline, the ratio of topic-related keywords to other words in the headline, the number of views or Page rank of the item, and other factors. Relevance may consider crowd-sourced data such as views and curation by users of a particular channel on particular items or items sourced from particular sources or authors.

In an example embodiment, slider 80 may filter items returned by a search for a topic by utilizing an algorithm based on a weighted scale which may consider the perceived reliability of the source (e.g., the New York Times or Wall Street Journal would be deemed more reliable than an anonymous TWITTER™ post) and the authority of the author, which may be determined based on the number of previous items posted by the author. The slider 80 may adjust the weighting of the algorithm based on crowd-sourced data as some items are liked, not liked, curated out, recommended to be deleted, or viewed, or the like.

Topic-related information may be provided via a rendering of the plurality of articles 82. An article may be rendered in any appropriate manner. In an example embodiment, as depicted in FIG. 6, a rendering of an article may comprise an icon and/or a description. Selection of an article may provide a feed to topic-related information form the article. For example, article 1 may provide a link to a YOUTUBE video. Selection of article 1 may result in a rendering of the YOUTUBE video. The rendering of the YOUTUBE video may be filtered as described above. The description of the article may comprise any appropriate description. For example, as depicted in FIG. 6, the description article may comprise a title of the article, and a time and a description of the source. For example, in accordance with the foregoing example scenario, the description may comprise a title of the YOUTUBE video, the time the video was obtained, and the name of the source (i.e., YOUTUBE).

The interface 70 may provide a mechanism for updating an intelligence channel via selection of item 84, depicted as "Curate" in FIG. 6. Selection of item 84 may allow an intelligence channel to be updated in any appropriate manner. For example, selection of item 84 may provide a link to a web page, or the like, wherein the intelligence channel may be updated, by providing a source, removing a source, combining source, adjusting filtering, adjusting filtering criteria, or the like, or any appropriate combination thereof.

Figure 7:
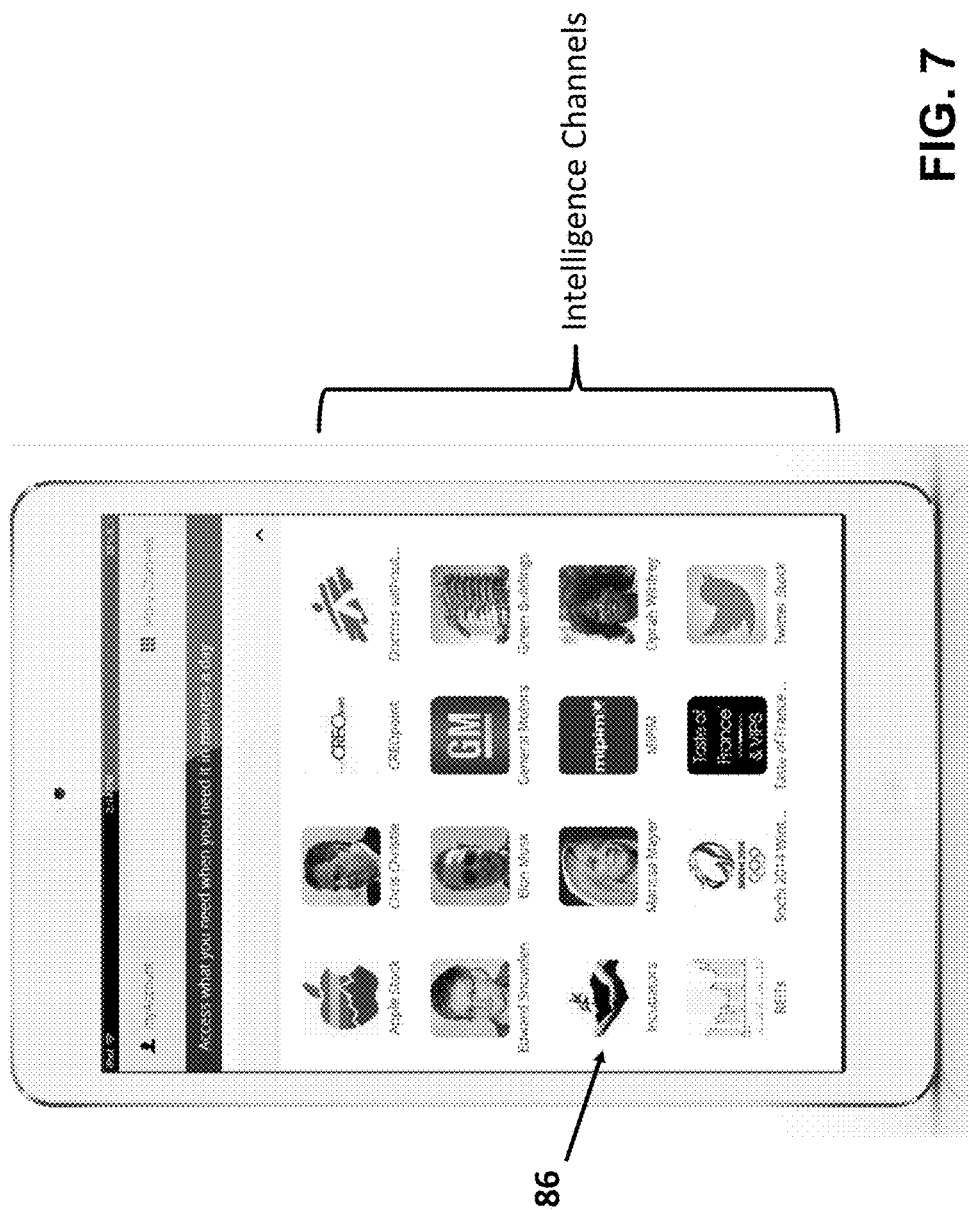
FIG. 7 illustrates an example interface for providing access to a plurality of intelligence channels.

FIG. 7 illustrates an example interface for providing access to a plurality of intelligence channels. As shown in FIG. 7, each intelligence channel may be represented by an icon and/or a description of the intelligence channel. For example, intelligence channel 86 is depicted by a graphic logo and textual description "Incubators," indicating the topic of the intelligence channel. Selection of intelligence channel 86 may provide link to an interface that provided topic related information.

Figure 8:
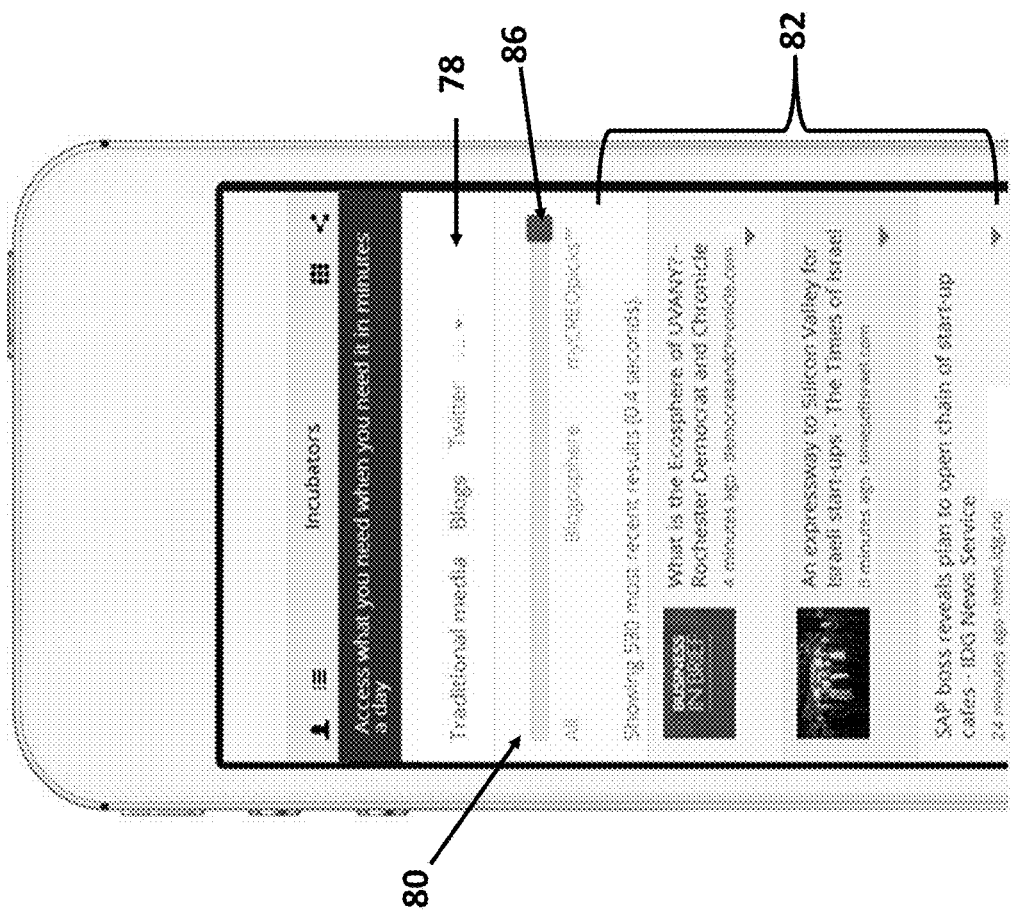
FIG. 8 illustrates an example interface that provides topic related information pertaining to incubators.

FIG. 8 illustrates an example interface that provides topic related information pertaining to incubators. Labels 78, 80, 82, and 86 on FIG. 8 correspond to labels 78, 80, 82, and 86 of FIG. 6, respectively, to identify items that function as previously described.

Referring again to FIG. 1, an intelligence channel may be updated at step 22 in any appropriate manner. As previously described, an intelligence channel may be updated based on filtering. An intelligence channel may be updated in an iterative fashion (self-learning closed loop) wherein problems found from quality testing and user experience may be fed back to improve channel development and refine the channel. This manner of updating may occur continuously, periodically, aperiodically, based on the occurrence of an event, or any appropriate combination thereof. In an example embodiment, an intelligence channel may be updated based on a user of an intelligence channel designating unwanted channels or designate channels to be combined or fused.

Crowdsourcing may be utilized to update an intelligence channel. An intelligence channel and/or information provided by an intelligence channel may be distributed and comments and/or suggestions may be received. The comments and/or suggests (e.g., clicks on a like or dislike button, clicks to remove an article, clicks through to review the article, etc.) may be utilized to update an intelligence channel. For example, an intelligence channel and/or information provided by an intelligence channel may be provided via for example, email, social media, TWITTER, LINKEDIN, FACEBOOK, GOOGLE, GOOGLE+, a social network, news articles, or the like, or any appropriate combination thereof. Recipients thereof may "like" a channel, article, source, or the like. A recipient thereof may request that a channel, article, source, or the like, be removed. This type of feedback may be utilized to update an intelligence channel. In an example embodiment, a database or the like, of such feedback may be generated and utilized for subsequent updates.

Figure 9:
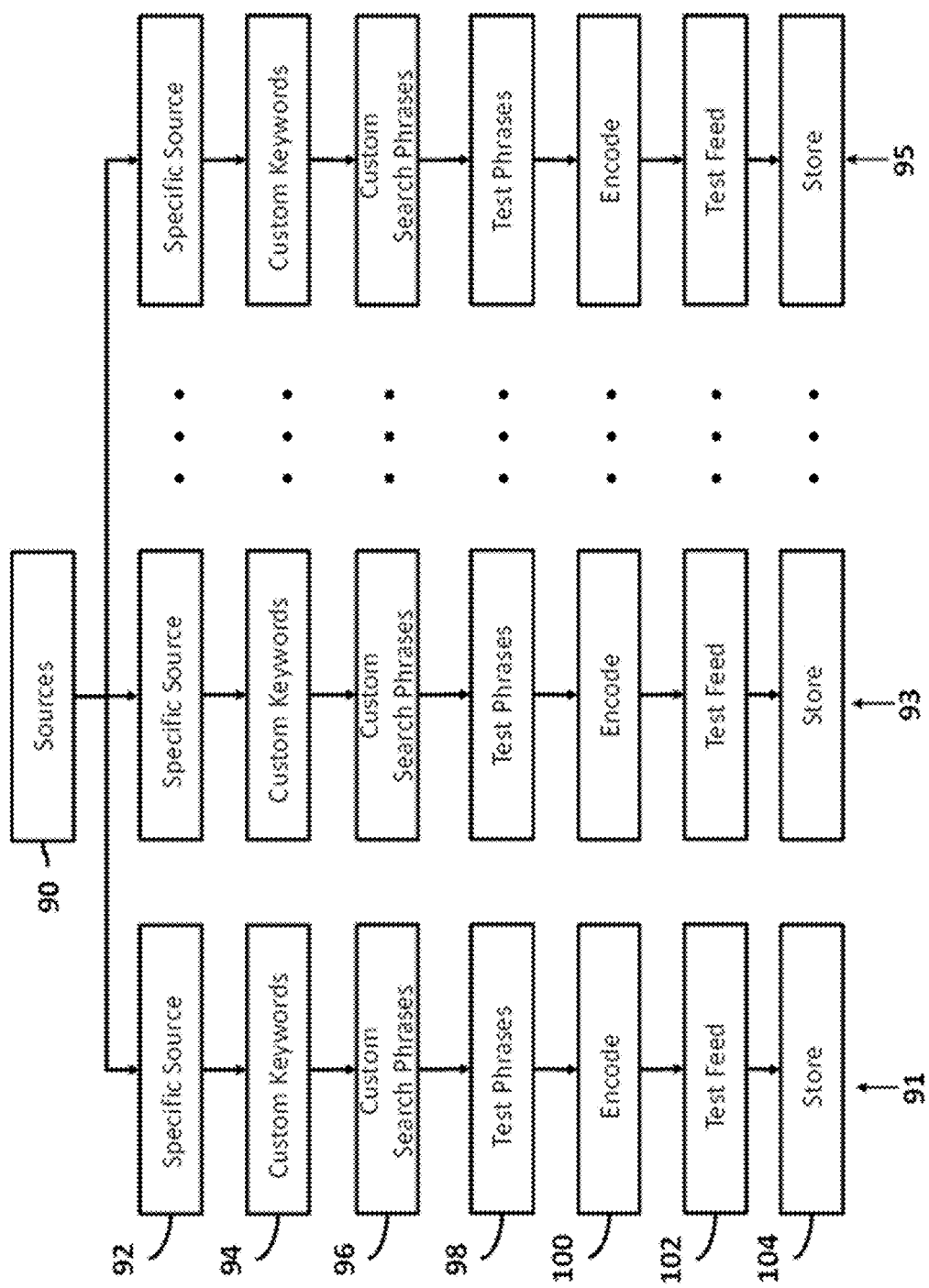
FIG. 9 is an example functional block diagram for developing an intelligence channel.

FIG. 9 is an example functional block diagram for developing an intelligence channel. Available sources 90 may be provided to multiple functional paths, depicted in FIG. 9 as columns 91, 93, and 95. Each functional path may perform operations on a specific source. A specific source may comprise any appropriate source. For example specific source 92 may represent TWITTER, GOOGLE, GOOGLE NEWS, GOOGLE BLOGS, YOUTUBE, FACEBOOK, BING, YAHOO, WIKIPEDIA, a direct feed, or the like. Note, functional components are labeled with numbers only in functional path 91 for the sake of simplicity. However, functions performed in functional path 91 may be performed in other functional paths (e.g. 93, 95) in a similar manner on the respective specific source of the functional path.

A specific source may be searched for keywords via a custom search at functional block 94. The custom search may be customized for the specific source based on the topic and/or by the user. For example, a custom search on TWITTER may comprise the URL (Uniform Resource Locator) https://twitter.com/search-advanced, a custom search on GOOGLE NEWS may comprise the URL http://news.google.com, a custom search on GOOGLE BLOGS may comprise the URL http://blogsearch.google.com, a custom search on YOUTUBE may comprise the URL http:www.youtube.com, a custom search on FACEBOOK may search a company or the like FACEBOOK page, or a custom search for a direct feed (e.g., RSS feed) may comprise searching for topic-related information via the direct feed, company web sites, news feeds, or the like.

Custom search phrases for topic related information using specific source search parameters may by generated at function block 96. For example, TWITTER may be searched using TWITTER specific search parameters and semantic structure, GOOGLE NEWS may be searched using GOOGLE specific search parameters and semantic structure, GOOGLE BLOGS may be searched using GOOGLE BLOGS specific search parameters and semantic structure, YOUTUBE may be searched using YOUTUBE specific parameters and semantic structure, or FACEBOOK may be searched using a FACEBOOK ID, user name, other FACEBOOK appropriate specific parameters and semantic structure, or the like.

Custom test phrases may be tested at functional block 98. Custom test phrases may be tested on the respective specific source utilizing an appropriate URL, and semantic structure for the specific source. For example, a custom phrase for TWITTER may be tested by using the URL https://twitter.com/search-advanced, a custom phrase for GOOGLE NEWS may be tested by using the URL http://news.google.com, a custom phrase for GOOGLE BLOGS may be tested by using the URL http://blogsearch.google.com, a custom phrase for YOUTUBE may be tested by using the URL http:www.youtube.com/rss/search[SEARCH], or a custom phrase for FACEBOOK may be tested by using the URL https://www.facebook.com/feeds/page.php?id, or the like.

Search phrases may be encoded at functional block 100. Search phrase encoding may handle special characters that are not allowed in URLs, which are limited to the ASCII character set and cannot contain spaces. As terms often contain characters outside the ASCII character set or spaces, the URL may be converted to a valid ASCII format. URL encoding may replace non ASCII characters with a "%" followed by two hexadecimal digits. For example, the normal text Michelle Günter may be encoded as Michelle%20G%C3%BCnter Encoded search phrases may be tested at on custom feed at functional block 102. And custom feeds and search phrased may be stored at functional block 104.

Figure 10:
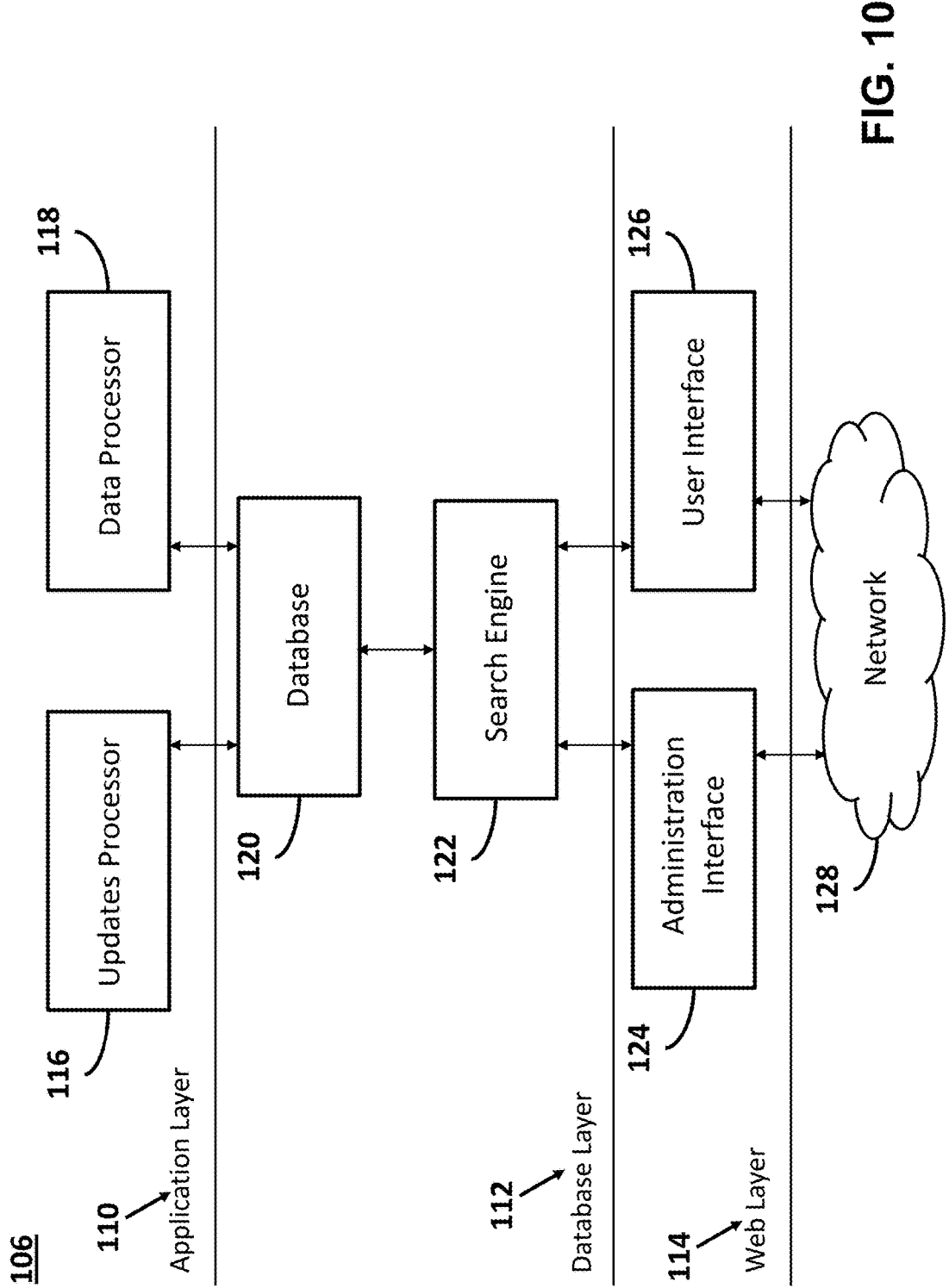
FIG. 10 is an example block diagram of a system for generating an intelligence channel and providing information via an intelligence channel.

FIG. 10 is an example block diagram of a system 106 for generating an intelligence channel and providing information via an intelligence channel. In an example embodiment, the system 106 may comprise an application layer, 110, a database layer 112, and a web layer 114. The application layer 110 may comprise any appropriate combination of an updates processor 116 and a data processor 118. The database layer 112 may comprise any appropriate combination of a database 120 and a search engine 122. The web layer 114 may comprise any appropriate combination of an administration interface 124 and a user interface 126, each of which may be coupled to a network 128.

In an example embodiment, the database 120 may be a mongo db, an open source program, and open sourced tools. The data processor 118 may generate the search parameters which may be implemented through the search engine, which may be GOOGLE or another commercially available search engine. The data processor handles the raw item data processing, analysis and enrichment, and interacts with the database by requesting raw items an storing enriched items to the database. The search engine delivers filtered keyword results and interacts with the database by requesting raw data and with the user interface by returning filtered data. The administration interface 124 may be utilized to define and refine the search parameters and keywords, includes and excludes, which operate through the search engine to generate results delivered to the database which are delivered to users through the user interface. The updates processor 118 may repeat the process periodically to update all results by scheduling source updates, requesting load balancing, requesting search preparation and execution, data aggregation, and low level filtering. The database 120 may track each article returned as associated with a search during the update process. The database 120 also may maintain all user information for purposes including payment processing and history, data mining, and crowd-sourced article or source ratings and determinations. The database is where all data is stored, including all searches, items retrieved, user information, including all clicks, likes, dislikes, curations, click-throughs, click-through destinations, curation information, billing information and the like. All other components interact with the database by requesting data for processing or display and sending data for storage.

Figure 11:
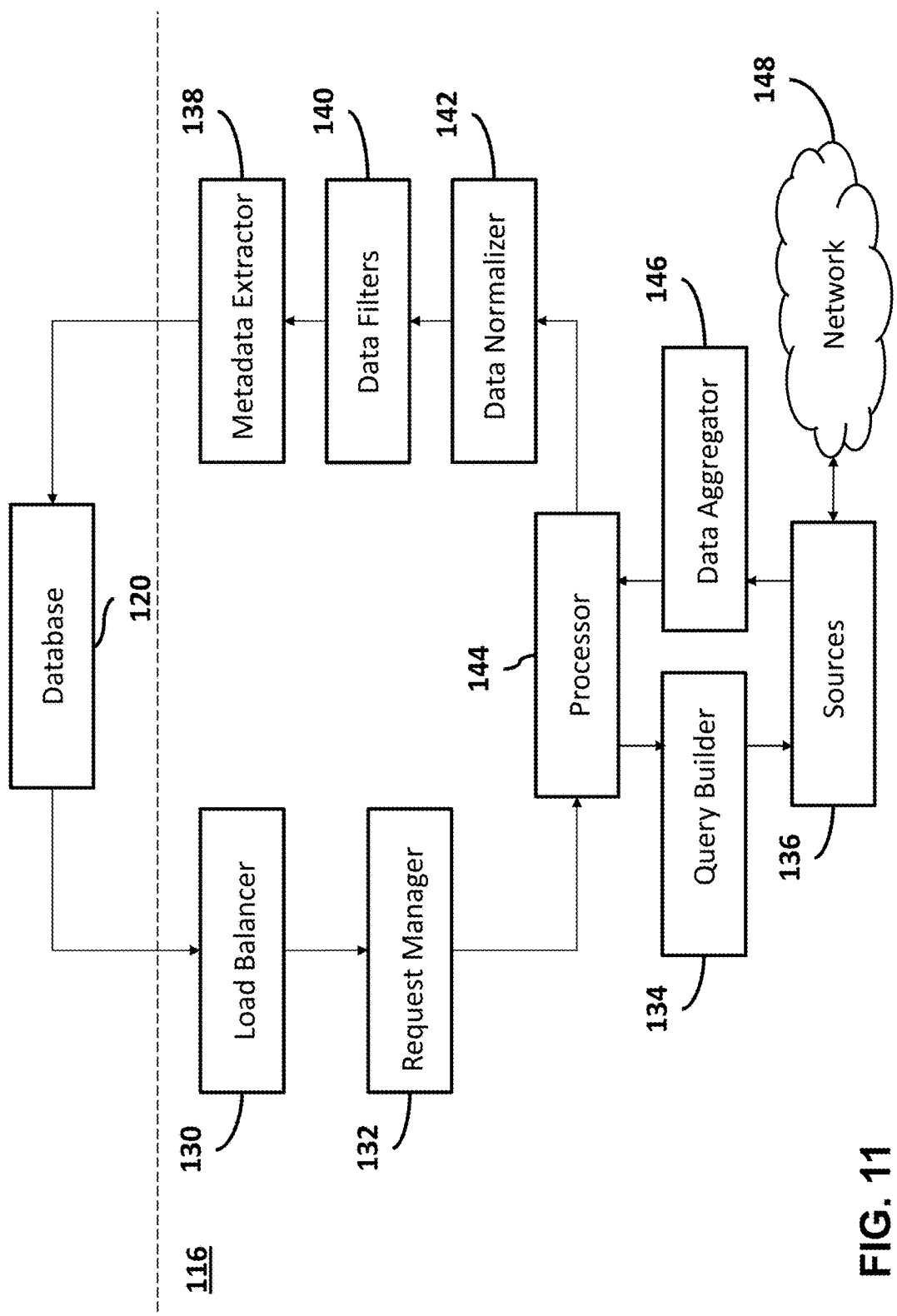
FIG. 11 is an example block diagram of the updates processor.

FIG. 11 is an example block diagram of the updates processor 116. In an example embodiment, the updates processor 116 may comprise any appropriate combination of a load balancer 130, a request manager 132, a metadata extractor 138, data filters 140, a data normalizer 142, a processor 144, a query boulder 134, a data aggregator 146. The updates processor schedules source updates and requests load balancing, request preparation and execution, data aggregation, and low level filtering. The updates processor interacts with the database by requesting data about channels and sources and storing raw items in the database. The query builder 134 and the data aggregator may be in communications with sources 136, which a may be in communications with a network 148.

The system may be designed to be horizontally scalable. The database and search engine(s) may be scaled as demand requires by adding additional servers (nodes). The updates processor and data processor may also be scaled horizontally by adding additional servers (nodes), provided that each server (node) acts as an individual instance of the updates processor and data processor. Load balancing is provided on a system database level.

In an example embodiment, the load balancer 130 may optimize usage of hardware and communications resources to minimize processing time and allow multiple searches to proceed simultaneously to reduce response time. The request manager 132 may interact with the load balancer 130 so requests from sources or to search engines are efficiently managed. The metadata extractor 138 may identify the appropriate metadata for identifying and indexing each article within the database, and may identify API versions and settings associated with particular sources. Data filters 140 may be used to remove irrelevant items identified through exclude statements, as including profanity or as duplicates. The query builder 134 may comprise a listing of the defining sources, keywords, includes, excludes, and filters for an intelligence channel. The data aggregator 146 may assemble data for delivery to the user through the user interface and filters duplicates.

Figure 12:
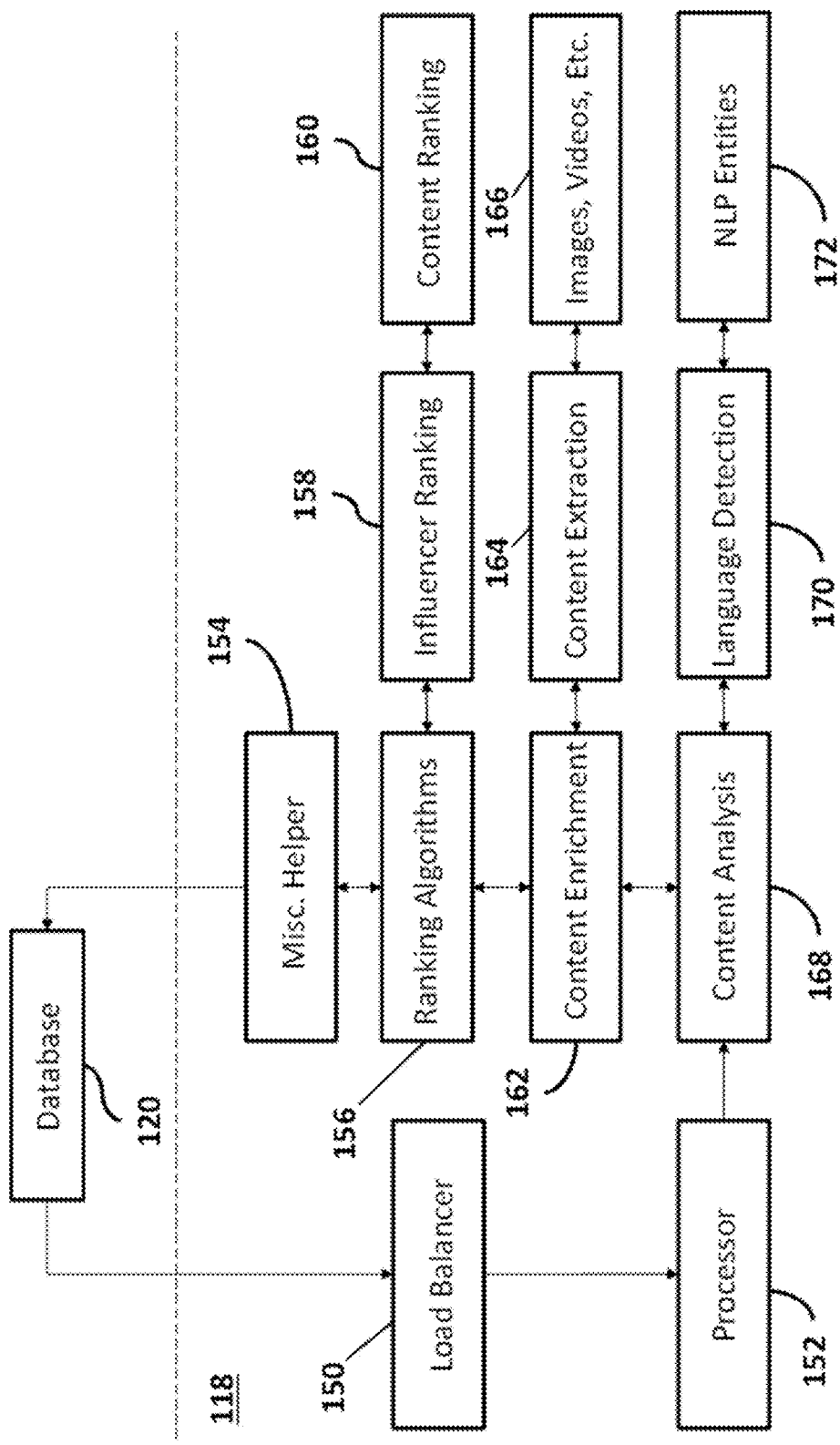
FIG. 12 is an example block diagram of the data processor.

FIG. 12 is an example block diagram of the data processor 118. In an example embodiment, the data processor 118 may comprise any appropriate combination of a load balancer 150, a processor 152, a miscellaneous helper 154, a ranking algorithm processor 156, an influencer ranking processor 158, a content ranking processor 160, a content enrichment processor 162, a content extraction processor 164, an images, video, etc. processor 166, a content analysis processor 168, a language detection processor 170, and a nature language processing (NLP) processor 172. The load balancer may monitor available request limits and scheduling requests. The ranking algorithm processor may comprise a system structural unit including "CREOrank", which may calculate the influence of a source based on prior instances of the source items and may be crowd-sourced, and content ranking, which may calculate item content relevance based on characteristics such as headline length, ration of keywords/stopwords to all words in item, occurrence of #hashtags and @usernames in the headline or item, content length, occurrence of keywords/stopwords in content, and the like. A content enrichment processor is a system structural unit which may extract content from text to provide structured data and extracts media elements (images, video, sound, etc.) from text. The content analysis module is a system structural element that includes language detection, which may include or exclude an item based on its language (French, German, English, Mandarin, Hebrew etc.) and natural language processing, which may detect and highlight certain types of data elements such as names of individuals, names of entities monetary values, times or dates or the like.

Figure 13:
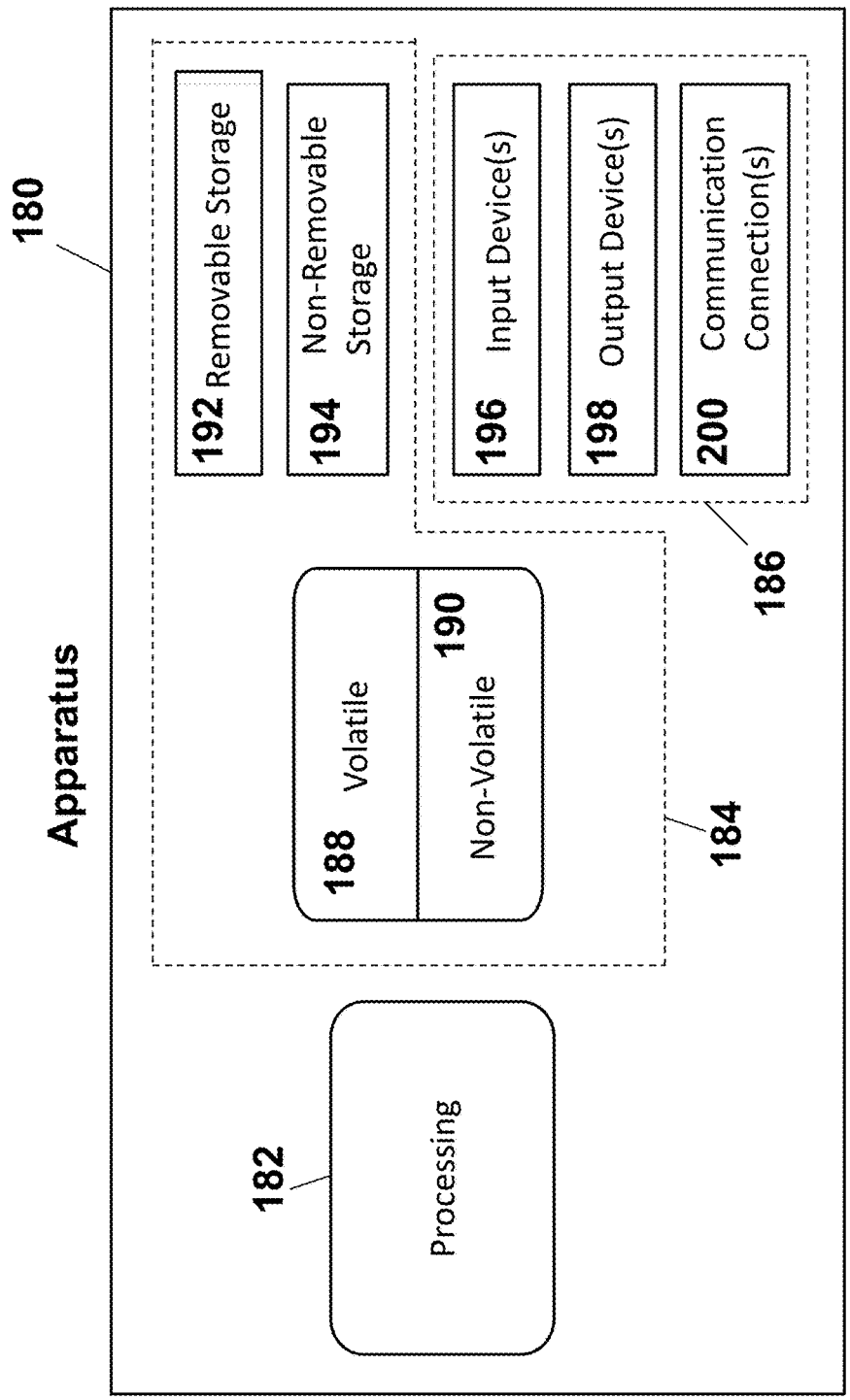
FIG. 13 is a block diagram of an example apparatus that may be utilized to implement and/or facilitate an intelligence channel.

FIG. 13 is a block diagram of an example apparatus 180 that may be utilized to implement and/or facilitate an intelligence channel as described herein. The apparatus 180 may comprise hardware or a combination of hardware and software. The apparatus 180 depicted in FIG. 13 may represent any appropriate apparatus, device, processor, server, a gateway, a node, a database, or the like, or any appropriate combination thereof. For example, the apparatus 180 may comprise an apparatus, a device, a processor, a server, a gateway, a node, a database, the updates processor 116, the data processor 118, the database 120, the search engine 122, the administration interface 124, the user interface 126, each of which may be coupled to a network 128, the load balancer 130, the request manager 132, the metadata extractor 138, the data filters 140, the data normalizer 142, the processor 144, the query boulder 134, the data aggregator 146, or the like, or any appropriate combination thereof. It is emphasized that the block diagram depicted in FIG. 13 is exemplary and not intended to imply a specific implementation or configuration. Thus, the apparatus 180 may be implemented in a single apparatus or multiple apparatuses (e.g., single server or multiple servers, single gateway or multiple gateways, single apparatus or multiple apparatuses, single node or multiple nodes, single processor or multiple processors, single database or multiple databases, single device or multiple devices, etc.). Multiple apparatuses may be distributed or centrally located. Multiple apparatuses may communicate wirelessly, via hard wire, or any appropriate combination thereof.

In an example embodiment, apparatus 180 may comprise a processor and memory coupled to the processor. The memory may comprise executable instructions that when executed by the processor cause the processor to effectuate operations associated with an intelligence channel as described herein. As evident from the herein description apparatus 180 is not to be construed as software per se.

In an example configuration, apparatus 180 may comprise a processing portion 182, a memory portion 184, and an input/output portion 186. The processing portion 182, memory portion 184, and input/output portion 186 may be coupled together (coupling not shown in FIG. 13) to allow communications therebetween. Each portion of the apparatus 180 may comprise circuitry for performing functions associated with an intelligence as described herein. Thus, each portion may comprise hardware, or a combination of hardware and software. Accordingly, each portion of the apparatus 180 is not to be construed as software per se. That is, processing portion 182 is not to be construed as software per se. Memory portion 184 is not to be construed as software per se. Input/output portion 186 is not to be construed as software per se. Volatile memory portion 188 is not to be construed as software per se. Non-volatile memory portion 190 is not to be construed as software per se. Removal storage portion 192 is not to be construed as software per se. Non-removal storage portion 194 is not to be construed as software per se. Input device(s) portion 196 is not to be construed as software per se. Input device(s) portion 198 is not to be construed as software per se. And communication connection(s) portion 200 is not to be construed as software per se. Each portion of apparatus 180 may comprise any appropriate configuration of hardware and software as would be ascertainable by those of skill in the art to perform respective functions of an intelligence channel The input/output portion 186 may be capable of receiving and/or providing information from/to a communications device and/or other apparatuses configured to generate and/or utilize an intelligence channel as described herein. For example, the input/output portion 186 may include a wireless communications (e.g., 2.5G/3G/4G/GPS) card. The input/output portion 186 may be capable of receiving and/or sending video information, audio information, control information, image information, data, or any combination thereof. In an example embodiment, the input/output portion 186 may be capable of receiving and/or sending information to determine a location of the apparatus 180 and/or a communications device. In an example configuration, the input/output portion 186 may comprise a GPS receiver. In an example configuration, the apparatus 180 may determine its own geographical location and/or the geographical location of a communications device through any type of location determination system including, for example, the Global Positioning System (GPS), assisted GPS (A-GPS), time difference of arrival calculations, configured constant location (in the case of non-moving devices), any combination thereof, or any other appropriate means. In various configurations, the input/output portion 186 may receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof. In an example configuration, the input/output portion may comprise a WIFI finder, a two way GPS chipset or equivalent, or the like, or a combination thereof.

The processing portion 182 may be capable of performing functions associated with an intelligence channel as described herein. In an example embodiment, the processing portion 182 may be capable of, in conjunction with any other portion of the apparatus 180, installing an application for an intelligence channel as described herein.

In a basic configuration, the apparatus 180 may include at least one memory portion 184. The memory portion 184 may comprise a storage medium having a concrete, tangible, physical structure. Thus, the memory portion 184, as well as any computer-readable storage medium described herein, is not to be construed as a transient signal. The memory portion 184, as well as any computer-readable storage medium described herein, is not to be construed as a propagating signal. The memory portion 184, as well as any computer-readable storage medium described herein, is to be construed as an article of manufacture. The memory portion 184 may store any information utilized in conjunction with an intelligence channel as described herein. Depending upon the exact configuration and type of processor, the memory portion 184 may be volatile 188 (such as some types of RAM), non-volatile 190 (such as ROM, flash memory, etc.), or a combination thereof. The apparatus 180 may include additional storage (e.g., removable storage 192 and/or non-removable storage 194) such as, for example, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the apparatus 180.

The apparatus 180 also may contain communications connection(s) 200 that allow the apparatus 180 to communicate with other apparatuses, devices, network entities, or the like. A communications connection(s) may comprise communication media. Communication media may typically embody computer readable instructions, data structures, program modules or other data in a modulated data signal such as a carrier wave or other transport mechanism and includes any information delivery media. By way of example, and not limitation, communication media may include wired media such as a wired network or direct-wired connection, and wireless media such as acoustic, RF, infrared, and other wireless media. The term computer readable media as used herein includes both storage media and communication media. The apparatus 180 also may include input device(s) 196 such as keyboard, mouse, pen, voice input device, touch input device, etc. Output device(s) 198 such as a display, speakers, printer, etc. also may be included.

FIG. 14 is a block diagram of an example device 220 that may be utilized to generate and/or implement an intelligence channel as described herein. The device 220 may comprise and/or be incorporated into any appropriate device, examples of which may include, a mobile device, a mobile communications device, a cellular phone, a portable computing device, such as a laptop, a personal digital assistant ("PDA"), a portable phone (e.g., a cell phone or the like, a smart phone, a video phone), a portable email device, a portable gaming device, a TV, a DVD player, portable media player, (e.g., a portable music player, such as an MP3 player, a Walkman, etc.), a portable navigation device (e.g., GPS compatible device, A-GPS compatible device, etc.), or a combination thereof. The device 220 can include devices that are not typically thought of as portable, such as, for example, a public computing device, a navigation device installed in-vehicle, a set top box, or the like. The mobile device 220 can include non-conventional computing devices, such as, for example, a kitchen appliance, a motor vehicle control (e.g., steering wheel), etc., or the like. As evident from the herein description device 220 is not to be construed as software per se.

The device 220 may include any appropriate device, mechanism, software, and/or hardware for facilitating and/or implementing an intelligence channel as described herein. In an example embodiment, the ability to generate and/or implement an intelligence channel is a feature of the device 220 that may be turned on and off. Thus, in an example embodiment, an owner and/or user of the device 220 may opt-in or opt-out of this capability.

In an example embodiment, the device 220 may comprise a processor and memory coupled to the processor. The memory may comprise executable instructions that when executed by the processor cause the processor to effectuate operations associated with an intelligence channel as described herein.

In an example configuration, the device 220 may comprise a processing portion 222, a memory portion 224, an input/output portion 226, and a user interface (UI) portion 228. Each portion of the device 220 may comprise circuitry for performing functions associated with each respective portion. Thus, each portion may comprise hardware, or a combination of hardware and software. Accordingly, each portion of the device 220 is not to be construed as software per se. That is, processing portion 222 is not to be construed as software per se. Memory portion 224 is not to be construed as software per se. Input/output portion 226 is not to be construed as software per se. And user interface portion 228 is not to be construed as software per se. Each portion of device 220 may comprise any appropriate configuration of hardware and software as would be ascertainable by those of skill in the art to perform respective functions of an intelligence channel as described herein. It is emphasized that the block diagram depiction of device 220 is exemplary and not intended to imply a specific implementation and/or configuration. For example, in an example configuration, the device 220 may comprise a cellular communications technology and the processing portion 222 and/or the memory portion 224 may be implemented, in part or in total, on a subscriber identity module (SIM) of the device 220. In another example configuration, the device 220 may comprise a laptop computer and/or tablet device (laptop/tablet). The laptop/tablet may include a SIM, and various portions of the processing portion 222 and/or the memory portion 224 may be implemented on the SIM, on the laptop/tablet other than the SIM, or any combination thereof.

The processing portion 222, memory portion 224, and input/output portion 226 may be coupled together to allow communications therebetween. In various embodiments, the input/output portion 226 may comprise a receiver of the device 220, a transmitter of the device 220, or a combination thereof. The input/output portion 226 may be capable of receiving and/or providing information pertaining to an intelligence channel as described herein. In various configurations, the input/output portion 226 may receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or any appropriate combination thereof.

The processing portion 222 may be capable of performing functions pertaining to an intelligence channel as described herein. In a basic configuration, the device 220 may include at least one memory portion 224. The memory portion 224 may comprise a storage medium having a concrete, tangible, physical structure. Thus, the memory portion 224, as well as any computer-readable storage medium described herein, is not to be construed as a transient signal. Further, the memory portion 224, as well as any computer-readable storage medium described herein, is not to be construed as a propagating signal. The memory portion 224, as well as any computer-readable storage medium described herein, is to be construed as an article of manufacture. The memory portion 224 may store any information utilized in conjunction with an intelligence channel as described herein. Depending upon the exact configuration and type of processor, the memory portion 224 may be volatile (such as some types of RAM), non-volatile (such as ROM, flash memory, etc.), or a combination thereof. The mobile device 220 may include additional storage (e.g., removable storage and/or non-removable storage) such as, for example, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the mobile device 220.

The device 220 also may contain a user interface (UI) portion 228 allowing a user to communicate with the device 220. The UI portion 228 may be capable of rendering any information utilized in conjunction with an intelligence channel as described herein. The UI portion 228 may provide the ability to control the device 220, via, for example, buttons, soft keys, voice actuated controls, a touch screen, movement of the mobile device 220, visual cues (e.g., moving a hand in front of a camera on the mobile device 220), or the like. The UI portion 228 may provide visual information (e.g., via a display), audio information (e.g., via speaker), mechanically (e.g., via a vibrating mechanism), or a combination thereof. In various configurations, the UI portion 228 may comprise a display, a touch screen, a keyboard, an accelerometer, a motion detector, a speaker, a microphone, a camera, a tilt sensor, or any combination thereof. The UI portion 228 may comprise means for inputting biometric information, such as, for example, fingerprint information, retinal information, voice information, and/or facial characteristic information.

The UI portion 228 may include a display for displaying multimedia such as, for example, application graphical user interfaces (GUIs), text, images, video, telephony functions such as Caller ID data, setup functions, menus, music, metadata, messages, wallpaper, graphics, Internet content, device status, preferences settings, map and location data, routes and other directions, points of interest (POI), and the like.

In some embodiments, the UI portion may comprise a user interface (UI) application. The UI application may interface with a client or operating system (OS) to, for example, facilitate user interaction with device functionality and data. The UI application may aid a user in entering message content, viewing received messages, answering/initiating calls, entering/deleting data, entering and setting user IDs and passwords, configuring settings, manipulating content and/or settings, interacting with other applications, or the like, and may aid the user in inputting selections associated with an intelligence channel as described herein.

In accordance with the herein description of intelligence channels, an intelligence channel may be utilized in various applications. In various example embodiments, an intelligence channel may comprise compilations or fusions of related topics into a single channel. The intelligence channel may comprise channels for a topic as a single "thought" channel encompassing a variety of opinions and ideas. An intelligence channel may comprise a "pack" of individual intelligence channels directed to topics in selected market segments, regions, and other areas of interest. The mechanisms for interfacing with intelligence channels may provide a user to search within an intelligence channel for subtopics of interest, and to generate intelligence channels directed to the subtopics. A user may define a private intelligence channel that is available to only designated recipients. Locations, addresses, or the like, from information provided via an intelligence channel may be automatically inserted into a map (e.g., GOOGLE MAPS, geocoding utilities, etc.). Automatic translation of information provided via an intelligence channel may be accomplished. A word cloud display may be generated from information provided via an intelligence channel for use in a presentation, display, posting, or the like. In an example embodiment, a word cloud display is a visualization of the frequency of use of the words in a document, in which the size of the font for each word is related to its frequency or use. Words may be scrambled and may be shown as in a cloud.

In various example embodiments, use of an intelligence channel may be monitored to observe user behavior to predict events that may be of interest to a user, to provide alerts that may be applicable to a user, to provide information of interest to a user, to generate a custom intelligence channel, to combine intelligence channels, or any appropriate combination thereof. A data feed may be provided (e.g., RSS, or other data feeds) comprising user requested intelligence channels for use on websites and displays, and potentially customized to employ user graphic formats, and user system feed requirements. Information provided via an intelligence channel may be viewed via any appropriate mechanism, such as, for example, offline viewing, standard readers, GOOGLE READER, KINDLE, or the like.

While an intelligence channel has been described in connection with the various embodiments of the various figures, it is to be understood that other similar embodiments may be used or modifications and additions may be made to the described embodiments of an intelligence channel without deviating therefrom. For example, one skilled in the art will recognize that embodiments and application of an intelligence channel as described in the instant application may apply to any environment, whether wired or wireless, and may be applied to any number of such devices connected via a communications network and interacting across the network. Therefore, an intelligence channel as described herein should not be limited to any single embodiment, but rather should be construed in breadth and scope in accordance with the appended claims.

What is claimed:

1. A method of creating a customizable real-time intelligence channel, comprising:

determining a plurality of possible sources of information on a selected topic for the real-time intelligence channel;

receiving a plurality of topic-related keywords for a search query for each source of the plurality of sources, wherein each keyword of the plurality of topic-related keywords is related to the selected topic and is used to determine whether or not to include or exclude search results including the keyword;

receiving search results from at least one search utilizing the topic-related keywords to identify topic-related information within said plurality of sources of information;

selecting from the plurality of sources, based on the searching, at least one topic-related source comprising topic-related information;

a data processor implementing a filtering algorithm to pass items of information from the at least one selected topic related source based on a weighted influence and relevance ranking of each item of information from the at least one topic related source to the selected topic, wherein:

an influence score of each item of information from the selected topic-related source is calculated based on source online presence data obtained from social networks for each source and weighted based on at least one of academic research, publications, and information available online and offline and adjusted based on crowd-sourced information, and a relevance score of each item of information from the selected topic-related source is calculated based on a similarity between the topic search query and the topic-related information and topic-related source and at least one of:

(1) a number of mentions of topic-related keywords in a headline of an item of information, (2) a ratio of topic-related keywords to other words in the headline of the item of information, (3) a ratio of topic related keywords to other words besides the headline in the item of information, (4) a number of mentions of topic-related keywords of the item of information compared to irrelevant mentions of non-topic relevant information, (5) a number of mentions of topic-related keywords in the topic-related source compared to irrelevant mentions of non-topic relevant information, and (6) views and curation by users of a particular intelligence channel on at least one of particular items of information and items of information sourced from at least one of particular relevant sources and authors, wherein implementing the filtering algorithm comprises filtering the topic-related information from the at least one selected topic-related source to remove at least one of an advertisement, information in a non-designated language, and duplicative information;

said data processor determining whether to pass each item of information from the at least one selected topic-related source through the filtering algorithm based on the weighted influence and relevance ranking of each item of information from the at least one selected topic-related source and reliability of the at least one topic related source, wherein relevance of search results from the topic-related source to the selected topic is based on actions of at least one user in at least one of (a) at least one of visiting, banning, and curating the source of the filtered topic-related information and (b) at least one of rating and deleting an item of information from the topic-related source; and the data processor assembling the items of information that pass through said filtering algorithm into a data stream and presenting the assembled data stream of topic-related information via an interactive interface as the customizable real-time intelligence channel for the selected topic.

2. The method of claim 1, wherein the relevance of search results from the topic-related source to the selected topic is based on at least one of crowd-sourced data including data views and curation by users of the customizable real-time intelligence channel of the selected topic-related source of at least one of particular items of information and sources of items of information from at least one of particular topic-related sources and particular authors.

3. The method of claim 1, further comprising:
respectively formatting the topic-related keywords in accordance with a format of each source of the plurality of sources of information on the selected topic; and
searching each source of the plurality of sources of information on the selected topic utilizing the respectively formatted topic-related keywords.

4. The method of claim 1, further comprising at least one of updating and curating the plurality of topic-related keywords and information sources based on at least one of crowdsourcing data, research by subject matter experts, and input from the user.

5. The method of claim 4, wherein at least one of updating and curating the plurality of topic-related keywords and information sources comprises at least one of providing a source, removing a source, combining sources, and adjusting filtering by the filtering algorithm.

6. The method of claim 1, further comprising determining at least one of the selected topic and a customizable real-time intelligence channel for a user based on predictive data mining of information related to the user.

7. The method of claim 1, the data processor further filtering noise from the topic-related information to remove profanity and other items of information that at least one of do not add value, are of limited relevance to the topic, and that lack substantive content.

8. The method of claim 1, wherein the topic-related information is ranked based on at least one of the influence and relevance of topic-related information returned in search results for the selected topic and crowdsourced information developed through aggregate actions of users in at least one of banning and curating a topic-related source of the customizable real-time intelligence channel for the selected topic.

9. The method of claim 1, wherein filtering topic-related information from the at least one selected topic-related source for relevance to the topic comprises checking a source blacklist to remove information from banned sources.

10. The method of claim 9, further comprising obtaining at least one of source online presence metrics and context to said customizable real-time intelligence channel from at least one of social networks and a third party service for each source, said source online presence metrics including influence and relevance to the topic of the customizable real-time intelligence channel and at least one of a number of posts the source has shared, a number of social media followers, and at least one of a number of retweets, likes, and reposts.

11. The method of claim 1, further comprising performing semantic analysis of sources of information to select at least one of photographs, places, names, companies, addresses, and phone numbers to generate enhanced source content and using natural language processing to highlight elements of interest in said enhanced source content.

12. The method of claim 1, further comprising associating a time with storage of search results whereby users selecting the customizable real-time intelligence channel within a predetermined time interval may receive stored information and users selecting the customizable real-time intelligence channel outside of the predetermined time interval trigger may receive a new search inquiry.

13. The method of claim 1, further comprising combining customizable real-time intelligence channels.

14. The method of claim 1, wherein determining whether or not to include or exclude search results includes evaluating information indicative of a false positive search result.

15. The method of claim 1, further comprising filtering said plurality of sources by comparing a dictionary of continuously updated domain names and social media usernames with a source URL of each source and, when there is a match, at least one of approving the source and tagging the source for further review, but when there is not a match, at least one of removing at least one of the source and information from the stream and tagging the source for further review.

16. The method of claim 1, wherein the weighted influence and relevance ranking of each item of information from the selected topic-related source that may pass through the filtering algorithm is controllable by a user by moving an interactive interface element to select more or less filtering of each item of information from the selected topic-related source.

17. A system for creating a customizable real-time intelligence channel, comprising:
a data processor;
an interactive interface; and
a memory coupled to the data processor, the memory including executable instructions that when executed by the data processor cause the data processor to effectuate operations comprising:
determining a plurality of possible sources of information on a selected topic for the real-time intelligence channel;
receiving a plurality of topic-related keywords for a search query for each source of the plurality of sources, wherein each keyword of the plurality of topic-related keywords is related to the selected topic and is used to determine whether or not to include or exclude search results including the keyword;
receiving search results from at least one search utilizing the topic-related keywords to identify topic-related information within said plurality of sources of information;
selecting from the plurality of sources, based on the searching, at least one topic-related source comprising topic-related information;
implementing a filtering algorithm to pass items of information from the at least one selected topic related source based on a weighted influence and relevance ranking of each item of information from the at least one topic related source to the selected topic, wherein:
an influence score of each item of information from the selected topic-related source is calculated based on source online presence data obtained from social networks for each source and weighted based on at least one of academic research, publications, and information available online and offline and adjusted based on crowd-sourced information, and a relevance score of each item of information from the selected topic-related source is calculated based on a similarity between the topic search query and the topic-related information and topic-related source and at least one of:
  (1) a number of mentions of topic-related keywords in a headline of an item of information,
  (2) a ratio of topic-related keywords to other words in the headline of the item of information,
  (3) a ratio of topic-related keywords to other words besides the headline in the item of information,
  (4) a number of mentions of topic-related keywords of the item of information compared to irrelevant mentions of non-topic relevant information,
  (5) a number of mentions of topic-related keywords in the topic-related source compared to irrelevant mentions of non-topic relevant information, and
  (6) views and curation by users of a particular intelligence channel on at least one of particular items of information and items of information sourced from at least one of particular relevant sources and authors,
wherein implementing the filtering algorithm comprises filtering the topic-related information from the at least one selected topic-related source to remove at least one of an advertisement, information in a non-designated language, and duplicative information;
determining whether to pass each item of information from the at least one selected topic-related source through the filtering algorithm based on the weighted influence and relevance ranking of each item of information from the at least one selected topic-related source and reliability of the at least one topic related source, wherein relevance of search results from the topic-related source to the selected topic is based on actions of at least one user in at least one of (a) at least one of visiting, banning, and curating the source of the filtered topic-related information and (b) at least one of rating and deleting an item of information from the topic-related source; and
assembling the items of information that pass through said filtering algorithm into a data stream and presenting the assembled data stream of topic-related information via the interactive interface as the customizable real-time intelligence channel for the selected topic.

18. The system of claim 17, wherein the relevance ranking includes at least one of crowd-sourced data including data views and curation by users of the customizable real-time intelligence channel of the selected topic-related source of at least one of particular items of information and sources of items of information from at least one of particular topic-related sources and particular authors.

19. The system of claim 17, further comprising instructions for at least one of updating and curating the plurality of topic-related keywords and information sources based on at least one of crowdsourcing data, research by subject matter experts, and input from the user.

20. The system of claim 17, further comprising instructions for determining at least one of the topic and a customizable real-time intelligence channel for a user based on predictive data mining of information related to the user.

21. The system of claim 17, wherein the interactive interface comprises:
  a selectable source region providing individually selectable access to a plurality of sources of topic-related information, wherein each source of the plurality of topic-related sources comprises information related to a topic and is individually selectable;
  a content region rendering topic-related information and providing access to a source of the rendered topic-related information; and
  an adjustable filter region providing adjustable filtering of the content region in response to adjustment of the interactive interface element to adjust a weighting of the source of the rendered topic-related information based on at least one of the influence on and relevance of the source of the rendered topic-related information to the topic, wherein content of the content region is dynamically modified, in real time, in response to adjustment of the interactive interface element.

22. The system of claim 17, wherein the data processor further processes instructions to filter noise from the topic-related information to remove profanity and items of information that at least one of do not add value, are of limited relevance to the topic, and that lack substantive content.

23. A non-transitory computer readable storage medium comprising executable instructions that when executed by a processor cause the processor to effectuate operations to perform a method of creating a customizable real-time intelligence channel, comprising:
  determining a plurality of possible sources of information on a selected topic for the real-time intelligence channel;
  receiving a plurality of topic-related keywords for a search query for each source of the plurality of sources, wherein each keyword of the plurality of topic-related keywords is related to the selected topic and is used to determine whether or not to include or exclude search results including the keyword;
  receiving search results from at least one search utilizing the topic-related keywords to identify topic-related information within said plurality of sources of information;
  selecting from the plurality of sources, based on the searching, at least one topic-related source comprising topic-related information;
  implementing a filtering algorithm to pass items of information from the at least one selected topic related source based on a weighted influence and relevance ranking of each item of information from the at least one topic related source to the selected topic, wherein:
    an influence score of each item of information from the selected topic-related source is calculated based on source online presence data obtained from social networks for each source and weighted based on at least one of academic research, publications, and information available online and offline and adjusted based on crowd-sourced information, and
    a relevance score of each item of information from the selected topic-related source is calculated based on a similarity between the topic search query and the topic-related information and topic-related source and at least one of:
      (1) a number of mentions of topic-related keywords in a headline of an item of information,
      (2) a ratio of topic-related keywords to other words in the headline of the item of information,
      (3) a ratio of topic-related keywords to other words besides the headline in the item of information,
      (4) a number of mentions of topic-related keywords of the item of information compared to irrelevant mentions of non-topic relevant information, (5) a number of mentions of topic-related keywords in the topic-related source compared to irrelevant mentions of non-topic relevant information, and (6) views and curation by users of a particular intelligence channel on at least one of particular items of information and items of information sourced from at least one of particular relevant sources and authors, wherein implementing the filtering algorithm comprises filtering the topic-related information from the at least one selected topic-related source to remove at least one of an advertisement, information in a non-designated language, and duplicative information;

determining whether to pass each item of information from the at least one selected topic-related source through the filtering algorithm based on the weighted influence and relevance ranking of each item of information from the at least one selected topic-related source and reliability of the at least one topic related source, wherein relevance of search results from the topic-related source to the selected topic is based on actions of at least one user in at least one of (a) at least one of visiting, banning, and curating the source of the filtered topic-related information and (b) at least one of rating and deleting an item of information from the topic-related source; and assembling the items of information that pass through said filtering algorithm into a data stream and presenting the assembled data stream of topic-related information via an interactive interface as the customizable real-time intelligence channel for the selected topic.

* * * * *